(12) United States Patent
Takeda et al.

(10) Patent No.: US 6,512,805 B1
(45) Date of Patent: Jan. 28, 2003

(54) LIGHT WATER REACTOR CORE AND FUEL ASSEMBLY

(75) Inventors: Renzo Takeda, Kawasaki (JP); Motoo Aoyama, Mito (JP); Junichi Miwa, Hitachi (JP); Motohiko Ikegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/660,356

(22) Filed: Sep. 12, 2000

(30) Foreign Application Priority Data

Sep. 14, 1999 (JP) .......................................... 11-259891
Nov. 26, 1999 (JP) .......................................... 11-335467

(51) Int. Cl.$^7$ ............................................... G21C 1/04
(52) U.S. Cl. ...................... 376/171; 376/172; 376/173; 376/428
(58) Field of Search ................................. 376/171–173, 376/180, 182, 346–351, 353, 370, 458, 463, 170

(56) References Cited

U.S. PATENT DOCUMENTS

| | | | | |
|---|---|---|---|---|
| 3,206,370 A | * | 9/1965 | Campbell et al. ........... | 376/449 |
| 3,640,844 A | | 2/1972 | Shank et al. ................ | 376/173 |
| 3,671,392 A | | 6/1972 | Beaudoin et al. ........... | 376/173 |
| 4,001,078 A | * | 1/1977 | Doll ........................... | 376/335 |
| 4,968,476 A | | 11/1990 | Radkowsky ................ | 376/172 |
| 5,164,153 A | * | 11/1992 | Fukumoto et al. .......... | 376/335 |
| 5,812,621 A | | 9/1998 | Takeda et al. .............. | 376/171 |
| 5,940,461 A | | 8/1999 | Takeda et al. .............. | 376/171 |

FOREIGN PATENT DOCUMENTS

| | | |
|---|---|---|
| EP | 01227993 | 9/1989 |
| EP | 0447108 | 9/1991 |
| EP | 0691657 | 1/1996 |
| FR | 2425127 | 11/1979 |
| GB | 2018009 | 10/1979 |
| JP | 8-21890 | 1/1996 |
| WO | 97/08711 | 3/1997 |

OTHER PUBLICATIONS

"The Role of REcyle–PWR with Innovative Fuel Cycle Technology", Proceedings of the International Conference on Future Nuclear Systems, GlOBAL '99 "Nuclear Technology–Bridging the Millenia", Aug. 29—Sep. 3, 1999.

"Study on Breeding Characteristics of Fast Spectrum BWR", International Conference on the Physics of Nuclear Science and Technology, Oct. 5–8, 1998.

Oldekop W. et al, "General Features of Advanced Pressurized Water Reactors With Improved Fuel Utilization,", NUCLEAR TECHNOLOGY, Nov. 1982, USA, vol. 59, No. 2, pp. 212–227.

* cited by examiner

Primary Examiner—Michael J. Carone
Assistant Examiner—Daniel Matz
(74) Attorney, Agent, or Firm—Mattingly, Stanger & Malur, P.C.

(57) ABSTRACT

There are provided a light water reactor core which has the same levels in cost efficiency and degree of safety as those of an existing BWR under operation now, that is, which is oriented to plutonium multi-recycle having a breeding ratio near 1.0 or slightly larger and having a negative void coefficient with minimizing modification of the reactor core structure of the existing BWR under operation now, and to fuel assemblies used for the boiling water reactor. The light water reactor core having an effective water-to-fuel volume ratio of 0.1 to 0.6 is formed by combining closed compact lattice fuel assemblies each composed of fuel rods having fuel which is enriched by adding plutonium or plutonium and an actinide to a uranium containing at least one of a depleted uranium, natural uranium, a degraded uranium and a low enriched uranium; high void fraction coolant of 45% to 70%; and large-diameter control rods to be inserted into the fuel assemblies, the large-diameter control rod comprising at least one absorption rod having a transverse cross-sectional area larger than a cross-sectional area of a unit lattice cell of the fuel rod.

32 Claims, 28 Drawing Sheets

① 17.5wt%
② 18.5wt%
○ 19.1wt%

LIGHT WATER REACTOR CORE AND FUEL ASSEMBLY

BACKGROUND OF THE INVENTION

The present invention relates to a light water reactor core and fuel assemblies composing a reactor core and, more particularly, to a light water reactor core wherein in a boiling water reactor (BWR), the BWR has the same levels in cost efficiency and degree of safety as those of an existing BWR under operation now, that is, the BWR is oriented to plutonium (Pu) multi-recycle having a breeding ratio near 1.0 or slightly larger and having a negative void coefficient with minimizing modification of the reactor core structure of the existing BWR under operation now, and to fuel assemblies used for the boiling water reactor.

In the inside of the reactor, while fissionable materials such as uranium-235 and plutonium-239 are being consumed by fission reaction, fertile materials such as uranium-238 and plutonium-240 are being converted to fissionable materials. The ratio of an amount of fissionable materials contained in the fuel unloaded from the reactor core to an amount of fissionable materials contained in the fuel loaded from the reactor core is called as a breeding ratio. The breeding ratio in a conventional light water reactor is approximately 0.5. Methods of improving the breeding are studied in order to effectively use the uranium resources.

Japanese Patent Application Laid-Open No.55-10591 and Nuclear Technology, Vol.59, pages 212–227 (1982) propose a method that the breeding ratio is improved in a pressurized water reactor by densely arranging fuel assemblies in a triangular lattice to decrease the water-to-fuel volume ratio. However, the obtained breeding ratio is 0.9 at maximum, and accordingly the fissionable material needs to be supplied in order to continue operation without reducing the output power. In order to further increase the breeding ratio, it can be considered to further decrease the water-to-fuel ratio by narrowing the gap between the fuel rods. However, it is difficult to narrow the gap between the fuel rods because there are limitations in manufacturing the fuel assembly and in securing thermal margin.

On the other hand, Japanese Patent Application Laid-Open No.1-227993 proposes a method that the water-to-fuel ratio is effectively decreased by making use of steam void generated in the reactor core which characterizes a boiling water reactor. It is shown that this conventional technology can increase the plutonium multiplication ratio (the ratio of amount of fissionable plutonium contained in fuel unloaded from the reactor core to an amount of fissionable plutonium contained in fuel loaded in the reactor core, that is, the breeding ratio to fissionable plutonium) up to nearly 1, but it is not shown that the breeding ratio (which is smaller by 4 to 5% than the plutonium multiplication ratio in the case where natural uranium is enriched by adding plutonium) can be increased approximately 1 or larger. In order to continue operation without reducing the output power in the case where the plutonium multiplication ratio is near 1, it is necessary that the natural uranium is enriched by being added with plutonium, and accordingly it is impossible to spent all the uranium resource. Therein, the words that the breeding ratio is larger than near 1 in the present invention means that the breeding ratio is larger than 0.98.

Further, Japanese Patent Application Laid-Open No.8-21890 discloses that in a reactor core comprising fuel which is enriched by adding plutonium or plutonium and an actinide to a uranium containing at least one of a depleted uranium, natural uranium, a degraded uranium and a low enriched uranium, the reactor core has a breeding ratio of near 1.0 or larger than 1.0 and a negative void coefficient. However, the prior art is not a technology which is intended to further improve the ability of a control rod to be manufactured and the cost performance of the control rod.

SUMMARY OF THE INVENTION

An object of the present invention is to provide a reactor core which has the same levels in power generation cost, thermal margin and degree of safety as those of a light water reactor under operation now and fuel assemblies used for the reactor core.

In order to attain the above-mentioned object, the present invention provide a light water reactor core comprising fuel which is enriched by adding plutonium or plutonium and an actinide (hereinafter, referred to as plutonium and the like) to a uranium containing at least one of a depleted uranium, natural uranium, a degraded uranium and a low enriched uranium (hereinafter, referred to as depleted uranium and the like), which further comprises fuel assemblies having fuel rods arranged in a triangular lattice configuration; and large-diameter control rods to be inserted into the fuel assemblies, the large-diameter control rod comprising at least one absorption rod having a transverse cross-sectional area larger than a cross-sectional area of a unit lattice cell of the fuel rod, wherein a breeding ratio of the reactor core is near 1.0 or larger than 1.0, and a void coefficient of the reactor core is negative. According to the present invention, in order to contribute to long-term stable energy supply, it is possible to realize the breeding ratio of 1.0 using the fuel enriched by adding plutonium to depleted uranium (hereinafter, referred to as the first effect). According to the present invention, since it is possible to attain the breeding ratio near 1.0 or larger than 1.0 using the fuel enriched by adding plutonium to depleted uranium, the depleted uranium and the like can be burned as if the plutonium would be used as a catalyst, which can contribute to the long-term stable energy supply.

A first preferable embodiment is a fuel assembly comprising fuel which is enriched by adding plutonium and the like to depleted uranium and the like, wherein a breeding ratio of the fuel assembly is near 1.0 or larger than 1.0. According to the first embodiment, the first effect can be attained. Since it is possible to attain the breeding ratio near 1.0 or larger than 1.0 using the fuel enriched by adding plutonium to depleted uranium, the depleted uranium and the like can be burned as if the plutonium would be used as a catalyst, which can contribute to the long-term stable energy supply.

Further, a second preferable embodiment is a light water reactor core comprising fuel assemblies having fuel rods arranged in a triangular lattice configuration; and large-diameter control rods to be inserted into the fuel assemblies, the large-diameter control rod comprising at least one absorption rod having a transverse cross-sectional area larger than a cross-sectional area of a unit lattice cell of the fuel rod. According to the second embodiment, the first effect can be attained, and at the same time, in order to contribute to the long-term stable energy supply, it is possible to realize the breeding ratio of 1.0 by reducing the water-to-fuel ratio and by using the fuel enriched by adding plutonium to depleted uranium (hereinafter, referred to as the second effect). Further, in the second embodiment, by using the large-diameter control rod, the mechanical strength of the control rod can be increased and accordingly bending and buckling of the control rod can be suppressed when the control rod is inserted or withdrawn. Furthermore, by using the large-diameter control rod, number of absorption rods per fuel assembly can be reduced, and accordingly the control rod can be easily manufactured to reduce the manufacturing cost.

Further, a third preferable embodiment is a light water reactor core comprising a water-excluding region on a surface of the guide tube, the water-excluding region being formed of a substance having a slowing down power smaller than a slowing down power of light water. According to the third embodiment, the second effect can be attained.

Further, a fourth preferable embodiment is a fuel assembly which comprises fuel rods closely arranged in a triangular lattice configuration, a gap between the rods being within the range of 0.7 to 2.0 mm. The light water reactor core may be constructed using the fuel assemblies. According to the fourth embodiment, the second effect can be attained.

Further, a fifth preferable embodiment is a fuel assembly of which an effective water-to-fuel volume ratio is within the range of 0.1 to 0.6. The light water reactor core may be constructed using the fuel assemblies. According to the fifth embodiment, the second effect can be attained. According to the fifth embodiment, by combination of the fuel assembly of closely-compact lattice having the fuel formed by adding plutonium to depleted uranium and the like and the large-diameter control rod to make the effective water-to-fuel volume ratio within the range of 0.1 to 0.6, it is possible to attain the breeding ratio near 1.0 or larger than 1.0 and to contribute to the long-term stable energy supply.

Further, a sixth preferable embodiment is a light water reactor core wherein an average fissionable plutonium enrichment in the reactor core except for an outer peripheral portion and blanket portions of a top and a bottom end portions is within the range of 6 to 20 wt %. According to the sixth embodiment, the second effect can be attained.

Further, a seventh preferable embodiment is a fuel assembly wherein an average fissionable plutonium enrichment in the fuel assembly except for blanket portions of a top and a bottom end portions is within the range of 6 to 20 wt %. According to the seventh embodiment, the second effect can be attained.

Further, an eighth preferable embodiment is a light water reactor core wherein a core-average void fraction under operation of an output power higher than 50% of a rated output power is within the range of 45 to 70%. According to the eighth embodiment, the second effect can be attained. According to the eighth embodiment, by combination of the fuel assembly of closely-compact lattice and the coolant of a high void fraction, the ratio of neutrons in resonance energy range is increased, the Doppler effect is increased and the absolute value of negative void coefficient is decreased. Therefore, the degree of safety under events of a power increase event, a pressurizing event and a coolant void fraction decreasing event can be improved.

Further, a ninth preferable embodiment is a light water reactor core wherein all the large-diameter control rods connected to one control drive mechanism are inserted into one fuel assembly, and the large-diameter control rods are inserted into all of the fuel assemblies loaded in a region except for an outermost peripheral of the reactor core. According to the ninth embodiment, the second effect can be attained without deteriorating the reactor shut down margin.

Further, a tenth preferable embodiment is a light water reactor core wherein all the large-diameter control rods connected to one control drive mechanism are inserted into one hexagonal or square fuel assembly, and the large-diameter control rods are inserted into all of the fuel assemblies loaded in a region except for an outermost peripheral of the reactor core. According to the tenth embodiment, the second effect can be attained without deteriorating the reactor shut down margin.

Further, an eleventh preferable embodiment is a light water reactor core wherein the plurality of large-diameter control rods connected to one control drive mechanism are inserted into three hexagonal fuel assemblies, and the large-diameter control rods are inserted into all of the fuel assemblies loaded in a region except for an outermost peripheral of the reactor core. According to the eleventh embodiment, the second effect can be attained without deteriorating the reactor shut down margin.

Further, a twelfth preferable embodiment is a light water reactor core wherein the plurality of large-diameter control rods connected to one control drive mechanism are inserted into four square fuel assemblies, and the large-diameter control rods are inserted into all of the fuel assemblies loaded in a region except for an outermost peripheral of the reactor core. According to the twelfth embodiment, the second effect can be attained without deteriorating the reactor shut down margin.

Further, a thirteenth preferable embodiment is a light water reactor core wherein the large-diameter control rod comprises a follower portion in a top end portion, the follower portion being made of a substance such as carbon, heavy water, beryllium, a zirconium alloy, a stainless steel or the like having a slowing down power smaller than a slowing down power of light water. According to the thirteenth embodiment, the second effect can be attained.

Further, a fourteenth preferable embodiment is a fuel assembly wherein an average value of fissionable plutonium enrichments of a fuel rod arranged in a region adjacent to the guide tube and a fuel rod arranged in a region most distant from the center of the fuel assembly is smaller than an average value of fissionable plutonium enrichments of fuel rods arranged in the other positions. According to the fourteenth embodiment, the second effect can be attained. Further, according to the fourteenth embodiment, the power peaking in the fuel assembly is reduced and accordingly the thermal margin can be increased.

Further, a fifteenth preferable embodiment is a light water reactor core wherein an average output power density of in a reactor core region except for an outer peripheral portion and blanket portions of a top and a bottom end portions is within the range of 100 kW/l to 300 kW/l. According to the fifteenth embodiment, the required plutonium inventory per unit output power can be reduced to operate as many nuclear power plants as possible using a determined amount of plutonium in order to contribute the long-term stable energy supply (hereinafter, referred to as a third effect), and the output power and the burn-up in the same level as those of an existing light water reactor plant under operation can be attained with the same thermal margin using the same materials and the same sized pressure vessel as those of the existing light water reactor plant in order to make the electric power generation cost compatible with that of the existing light water reactor (hereinafter, referred to as a fourth effect), and further the negative void coefficient can be realized by increasing of neutron leakage in the reactor core height direction and by using swing of power distribution in the reactor core height direction at increasing output power in order to make the degree of safety compatible with that of the existing light water reactor (hereinafter, referred to as a fifth effect).

According to the fifteenth embodiment, since the diameter of the pressure vessel, the operating conditions such as output power and the used materials are the same as those of the existing BWR under operation, the electric power generation cost can be suppressed to the same level as that of the existing BWR even though the performance is largely progressed. According to the fifteenth embodiment, the plutonium inventory per unit output power is reduced by increasing the power density of the reactor core to 100 to 300 kW/l, and the capacity of the present invention electric power plant operable by a determined amount of plutonium can be increased, which contributes to the long-term stable energy supply.

Further, a sixteenth preferable embodiment is a light water reactor core wherein in regard to a height direction of the reactor core except for blanket portions of a top and a bottom end portions, a length having an average fissionable plutonium enrichment with respect to a horizontal cross section of the fuel assembly-higher than 6 wt % is within the range of 40 cm to 140 cm. According to the sixteenth embodiment, the third effect, the fourth effect and the fifth effect can be attained. According to the sixteenth embodiment, the plutonium inventory can be decreased by generating the same output power as an ABWR (Advanced Boiling Water Reactor) under construction at present time can be obtained using a pressure vessel having a diameter compatible with that of the ABWR, and by employing the short-length fuel assemblies for the reactor core height of 40 to 140 cm. Therefore, many of the reactors according to the present invention can be operated using the plutonium produced from used fuel of light water reactors under the limited deposits of natural uranium in the world, which can contribute the long-term stable energy supply.

Further, according to the sixteenth embodiment, the reactor core having the negative void coefficient can be realized by increasing of neutron leakage in the reactor core height direction and by using swing of power distribution in the reactor core height direction, and accordingly the reactor core can attain the degree of safety in the same level as that of the existing light water reactor of a fuel burned-only type. That is, in regard to a height direction of the reactor core except for blanket portions of a top and a bottom end portions, a length having an average fissionable plutonium enrichment with respect to a horizontal cross section of the fuel assembly higher than 6 wt % is within the range of 40 cm to 140 cm. Therefore, the plutonium inventory per unit output power is reduced, and the capacity of the present invention electric power plant operable by a determined amount of plutonium can be increased, which contributes to the long-term stable energy supply. At the same time, the negative void coefficient can be increased by increasing of neutron leakage in the reactor core height direction at increasing the output power, which contributes the safety.

Further, a seventeenth preferable embodiment is a fuel assembly wherein in regard to a height direction of the reactor core except for blanket portions of a top and a bottom end portions, a length having an average fissionable plutonium enrichment with respect to a horizontal cross section of the fuel assembly higher than 6 wt % is within the range of 40 cm to 140 cm. According to the seventeenth embodiment, the third effect, the fourth effect and the fifth effect can be attained. According to the sixteenth embodiment, the plutonium inventory can be decreased by generating the same output power as the ABWR under construction at present time can be obtained using a pressure vessel having a diameter compatible with that of the ABWR, and by employing the short-length fuel assemblies for the reactor core height of 40 to 140 cm. Therefore, many of the reactors according to the present invention can be operated using the plutonium produced from used fuel of light water reactors under the limited deposits of natural uranium in the world, which can contribute the long-term stable energy supply.

Further, according to the seventeenth embodiment, the reactor core having the negative void coefficient can be realized by using the short length fuel assemblies to increase the neutron leakage in the reactor core height direction and to use the swing of power distribution in the reactor core height direction, and accordingly the reactor core can attain the degree of safety in the same level as that of the existing light water reactor of a burned-only fuel type. That is, in regard to a height direction of the reactor core except for blanket portions of a top and a bottom end portions, a length having an average fissionable plutonium enrichment with respect to a horizontal cross section of the fuel assembly higher than 6 wt % is within the range of 40 cm to 140 cm. Therefore, the plutonium inventory per unit output power is reduced, and the capacity of the present invention electric power plant operable by a determined amount of plutonium can be increased, which contributes to the long-term stable energy supply. At the same time, the negative void coefficient can be increased by increasing of neutron leakage in the reactor core height direction at increasing the output power, which contributes the safety.

Further, an eighteenth preferable embodiment is a light water reactor core wherein the reactor core except for the outermost periphery of the reactor core is radially divided into two equal-area regions, and fuel assemblies are loaded so that an average value of number of cycles staying in the reactor core of the fuel assemblies loaded in the outer reactor core region is smaller than an average value of number of cycles staying in the reactor core of the fuel assemblies loaded in the inner reactor core region. According to the eighteenth embodiment, the fourth effect can be attained. According to the eighteenth embodiment, the electric power generation cost can be made compatible with that of the existing BWR by employing the diameter of the pressure vessel, the operating conditions such as the output power and the used materials nearly equal to those of the BWR under operation even though the performance is largely improved.

Further, a nineteenth preferable embodiment is a light water reactor core wherein an average value of orifice pressure drop coefficient of the fuel assemblies in an outermost periphery of the reactor core and adjacent to the outermost periphery is larger than an average value of orifice pressure drop coefficient of the fuel assemblies in the other regions. According to the nineteenth embodiment, the fourth effect can be attained. According to the nineteenth embodiment, the electric power generation cost can be made compatible with that of the existing BWR by employing the diameter of the pressure vessel, the operating conditions such as the output power and the used materials nearly equal to those of the BWR under operation even though the performance is largely improved.

Further, a twentieth preferable embodiment is a fuel assembly wherein an average value of fissionable plutonium enrichment in an upper half of the fuel assembly except for blanket portions of a top and a bottom end portions is lower than an average value of fissionable plutonium enrichment in an lower half. According to the twentieth embodiment, the fifth effect can be attained. According to the twentieth embodiment, the reactor core having the negative void coefficient can be realized- by using the upper-and-lower two-region fuel assemblies to increase the neutron leakage in the upper and lower directions of the reactor core and to use the swing of power distribution in the upper and the lower directions of the reactor core, and accordingly the reactor core can attain the degree of safety in the same level as that of the existing light water reactor of a burned-only fuel type. That is, because the average value of fissionable plutonium enrichment in the upper half of the fuel assembly except for the blanket portions of the top and the bottom end portions is lower than the average value of fissionable plutonium enrichment in the lower half, the output power distribution in the reactor core height direction is flattened to increase the thermal margin and the swing of the output power distribution in the reactor core height direction acts at increasing the amount of steam generation to increase the negative void reactivity coefficient, which contributes to improvement of the degree of safety.

Further, a twenty-first preferable embodiment is a fuel assembly wherein in regard to a height direction of the fuel assembly except for blanket portions of a top and a bottom end portions, the fuel assembly comprises regions having an average fissionable plutonium enrichment higher than 6 wt % in an upper and a lower parts of the fuel assembly; and a region having an average fissionable plutonium enrichment lower than 6 wt % in a region near a middle portion between the upper and the lower regions. According to the twenty-first embodiment, the fifth effect can be attained. According to the twenty-first embodiment, the reactor core having the negative void coefficient can be realized by using the axially heterogeneous fuel assemblies to increase the neutron leakage in the upper and lower directions of the reactor core and to use the swing of power distribution in the upper and the lower directions of the reactor core, and accordingly the reactor core can attain the degree of safety in the same level as that of the existing light water reactor of a burned-only fuel type. That is, because in regard to the height direction of the fuel assembly except for the blanket portions of the top and the bottom end portions, the fuel assembly comprises the regions having the average fissionable plutonium enrichment higher than 6 wt % in the upper and the lower parts of the fuel assembly and the region having the average fissionable plutonium enrichment lower than 6 wt % in the region near the middle portion between the upper and the lower regions, the negative void reactivity coefficient due to the output power distribution swing in the vertical direction of the reactor core when the output power of the reactor core is increased and the amount of steam generation is increased, which contributes to improvement of the safety. Furthermore, the plutonium inventory capable of being loaded in the reactor core is increased by the neutron absorption effect of the region near the middle position in the axial direction of the reactor core, which improves the function as a plutonium storage reactor. In addition, since the height of the reactor core is relatively becomes higher and the total length of the assembly becomes longer, the thermal margin to the maximum linear power density becomes larger.

Further, a twenty-second preferable embodiment is a light water reactor core wherein a steam weight ratio at the reactor core exit under operation of an output power higher than 50% of the rated output power is within the range of 20 wt % to 40 wt %. According to the twenty-second embodiment, in order to the degree of safety of the light water reactor is made comparative with the existing light water reactor, the distillation function by boiling is maintained and the radioactive substances existing in the reactor core can be enclosed inside the pressure vessel (hereinafter referred to as a sixth effect). According to the twenty-second embodiment, the radioactive substances such as corrosion products accumulated in the reactor core can be enclosed in the reactor core by maintaining the distillation function because the steam weight ratio of the coolant at the reactor core exit is suppressed below 40 wt %. Therefore, the radiation level in the turbine side can be maintained in the same level in the existing BWR plant under operation now, and at the same time the radiation level can be extremely reduced compared to one of the conventional conceptual breeder reactors of a steam cooling fast breeder reactor.

Further, a twenty-third preferable embodiment is a fuel assembly wherein plutonium and uranium extracted from used fuel are loaded at a time. A light water reactor core may be composed of the fuel assemblies. According to the twenty-third embodiment, in order to cope with the nuclear non-proliferation, the plutonium and the uranium can be recycled together by abolishing sole extraction of the plutonium (hereinafter, referred to as a seventh effect). According to the twenty-third embodiment, since the plutonium and the uranium are recycled together, the effect of nuclear non-proliferation can be improved.

Further, a twenty-fourth preferable embodiment is a fuel assembly wherein plutonium, uranium and actinides extracted from used fuel are loaded at a time. A light water reactor core may be composed of the fuel assemblies. According to the twenty-fourth embodiment, in order to avoid to leave long-life radioactive wastes to future generation, the actinides can be recycled by placing the actinides in the reactor core together with the uranium and the plutonium (hereinafter, referred to as an eighth effect). According to the twenty-fourth embodiment, since plutonium, uranium and actinides are recycled at a time, the amount of increased actinides can be made zero by balancing the generating amount and the eliminating amount, and the long half life actinides, one of the most problem nuclides among the radioactive wastes, can be enclosed only in the nuclear reactor, the reprocessing facility and the fuel manufacturing facility. Therefore, the protection to the environment can be improved.

According to studies of the inventors of the present invention, the following have been clarified.

An amount of natural uranium resource over the world is estimated to be around 15 million tons which corresponds to the amount capable of operation one thousand existing light water reactor plants of electric power 1000 MW for about 100 years. As the result, depleted uranium of slightly less than 15 million tons and fissionable plutonium of 15 thousands tons are left. Therefore, using the fuel which is the depleted uranium enriched by the plutonium, a power reactor having 1.0 breeding ratio (RBWR: Resource-Renewable Boiling Water Reactor) can continue nuclear fission of the depleted uranium using the plutonium like a catalyst with 10 ton fissionable plutonium inventory, including in- and out-core, per 1000 MW electric power output. Since uranium generates approximately 1 MWD thermal energy per 1 g uranium, 1500 RBWRs can be operated for 10 thousands years using the depleted uranium of slightly less than 15 million tons and the fissionable plutonium of 15 thousands tons, and the whole amount of uranium resource can be spent. Therefore, the above-mentioned first effect of long-term stable energy supply can be attained.

Further, the above-mentioned second effect is produced by the following action. According to the studies of the inventors of the present invention, the relationship between the breeding ratio and the effective water-to-fuel volume ratio in the light water reactor core has been clarified as follows. The effective water-to-fuel volume ratio (Vm/Vf)eff is a value obtained by modifying a geometrical water-to-fuel volume ratio (Vm/Vf)geo (a water-to-fuel volume ratio without generation of steam void) in taking generation of steam void into consideration. Letting a decreasing ratio of hydrogen density due to generation of steam void be F, the relationship between the both is as follows.

$$(Vm/Vf)eff=F(Vm/Vf)geo \qquad \text{(Equation 1)}$$

The ratio F relates to a core-average steam void fraction V (%) as follows.

$$F=(100-V)/100+fV/100,$$

where f is a ratio of a density of saturation steam to a density of saturation water.

Since the ratio f is generally as a small value as approximately 1/20, the ratio F can be approximated as follows.

$$F \approx (100-V)/100$$

FIG. 2 shows the relationship among the effective water-to-fuel volume ratio, the conversion ratio defined from neutron balance and three factors composing the conversion ratio.

$$\text{Conversion ratio} = \alpha(1+\beta)-(1+\gamma) \qquad \text{(Equation 2)}$$

where

α: number of neutrons newly produced when a neutron is absorbed into a fissionable substance and the fissionable substance is eliminated, β: ratio of additional neutrons by nuclear fission of parent fuel substance in high energy range, and γ: ratio of useless neutron capture (including neutron leakage) to neutron absorption by fissionable substance.

The existing light water reactor under operation now has an effective water-to-fuel volume ratio of approximately 2.0 and a breading ratio of approximately 0.5. In order to attain the breeding ratio of nearly 1, it is necessary to bring the above-mentioned conversion ratio to near 1. According to the studies of the inventors of the present invention, it has been clarified that the breeding ratio near 1 can be attained with a conversion ratio above 0.85 by increasing the fissionable plutonium enrichment within a range to be described later and by increasing neutron leakage to the blanket. The effective water-to-fuel volume ratio for satisfying the above is below 0.6. On the other hand, because the core-average steam void fraction needs to be a value exceeding 70% in order to make the effective water-to-fuel volume ratio below 0.1, the two-phase flow condition at the reactor core exit can not be kept at a transient event.

The effective water-to-fuel volume ratio of 0.1 to 0.6 can be attained by closely arranging the fuel rods, or by making use of the steam void produced in the reactor core, or by excluding the moderator by inserting a follower in an inserting position of the control rod when the control rod is not placed in the inserting position, or by combining the above three methods. FIG. 3 shows an example of relationship between gap between rods and geometrical water-to-fuel volume ratio. FIG. 3 shows the cases where the diameters of the fuel rod are within the range of approximately 9.5 to 12.3 mm which are used in the existing light water reactors and the fuel rod lattice is regular triangular. When the gap between the rods is below 2 mm, the (Vm/Vf)geo of the fuel rod lattice becomes below approximately 0.9. In the case where the fuel rods are closely arranged in the regular triangular configuration, the (Vm/Vf)geo of the fuel assembly system becomes a value larger than the (Vm/Vf)geo of the fuel rod lattice by 0.1 to 0.2 when the gap region between the fuel assemblies and the control rod insertion region are taking into consideration. Therefore, in order to realize the effective water-to-fuel volume ratio below 0.6 under the condition of the geometrical water-to-fuel volume ratio, it can be understood from Equation 1 that the core-average steam void fraction needs to be above 45% (it can be understood from the relationship shown in FIG. 6 that the mass steam quality at the reactor core exit needs to be above 20 wt %). On the other hand, when the gap between the fuel rods is within the range of 0.7 mm (the minimum value of the gap between the rods from the viewpoint of manufacturing the fuel assembly and securing the thermal margin) to 1.0 mm (larger than 1.0 mm is capable in the case where the diameter of the fuel rod is larger than 9.5 mm), the ratio (Vm/Vf)geo can be made smaller than approximately 0.6 with the steam void fraction of 0%.

FIG. 4 shows the relationship between fissile PU enrichment and breeding ratio. In order to maintain the reactor core in the critical condition through the operating period, it is necessary to keep the fissionable plutonium enrichment above 6 wt %. On the other hand, although the breeding ratio is decreased as the fissionable plutonium enrichment is increased, it has been found that the breeding ratio of near 1 can be attained up to the fissionable plutonium enrichment of 20 wt % by increasing neutron leakage to the blanket in making use of increase of the excessive reactivity, as described above.

In that case, as a means for controlling the reactivity of the reactor core, a method considered is that a large-diameter control rod composed of an absorption rod having a cross-sectional area larger than a cross-sectional area of the fuel rod unit lattice cell is inserted into the fuel assembly. By the combination described above, the reactor core having the breeding ratio of 1.0 can be attained.

Further, the third, the fourth and the fifth effects described above can be obtained by the action to be described below. According to the studies of the inventors of the present invention, it has been found that by setting the power of the fuel assembly per unit horizontal cross section of the reactor core to a value nearly equal to that of the existing boiling water reactor, a height of the fuel assembly (an effective core height: a length of a region where the horizontal cross-sectional averaged fissile PU enrichment is above 6 wt %) can be decreased while the thermal margin is being secured. As the result of closely arranging the fuel rods in order to make the effective water-to-fuel volume ratio below 0.6, number of fuel rods per unit horizontal cross section of the reactor core becomes 3 to 4 times as large as that of the existing boiling water reactor. Therefore, the height of the fuel assembly (effective core length) having an average linear power density equal to that of the existing boiling water type light water reactor becomes 1/3 to 1/4 times as small as that of the existing boiling water type light water reactor.

In addition, since the moderator is uniformly distributed compared to the existing boiling water reactor, the local power peaking coefficient of the fuel rod can be decreased by nearly 30% or more (by employing the enrichment distribution, if necessary). Further, due to small change in burn-up and small change in void reactivity and together with the other means to be described below, the local power peaking coefficient of the fuel rod can be decreased by nearly 40% or more. Therefore, the height of the fuel assembly (effective core length) having an average linear power density equal to or more than that of the existing boiling water type light water reactor becomes 40 cm or more, that is, nearly 1/10 times as small as that of the existing boiling water type light water reactor. On the other hand, by shortening the effective core length to increase neutron leakage in the axial direction, the void coefficient reducing effect can be used. According to the studies of the inventors of the present invention, it is found that if the effective core length is smaller than 140 cm, the negative void coefficient can be realized by combining the other means to be described below. Although a ratio of power generation in the blanket portion is increased due to the shortening of the effective core length, the average power density in the region other than the blanket portion becomes approximately 100 to 300 kW/l due to the shortening of the effective core length.

As the result, since a pressure vessel having a diameter nearly equal to that of the existing reactor can contain the RBWR having the same output power, the electric power generation cost can be kept in the same level as that of the existing light water reactor and the degree of safety can be also kept in the same level as that of the existing light water reactor. Thereby, the plutonium inventory can be reduced, and accordingly many power generating plants can be operated by a definite amount of plutonium, which realizes the stable energy supply.

Further, the above-mentioned fifth effect is produced by the following action. According to the studies of the inventors of the present invention, by making the fissionable plutonium enrichment in the upper portion of the reactor core higher than the fissionable plutonium enrichment in the lower portion of the reactor core, the power distribution in the axial direction of the reactor core can be flattened and as a result the plutonium inventory can be reduced. Further, when the output power is increased or when the core coolant flow rate is decreased, the steam void fraction in the reactor core is increased. At that time, as shown in FIG. 5, the power distribution is swung to the lower portion of the reactor core where the fissionable plutonium enrichment is relatively lower and the neutron importance is small, and thereby the reactivity of the reactor core can be decreased (the negative void coefficient).

Furthermore, the above-mentioned second effect is produced by the following action. According to the studies of the inventors of the present invention, the reactor core structure of closely arranging the fuel rods in the regular triangle lattice configuration can be realized by inserting the large-diameter control rod into the fuel assembly. Further, according to the studies of the inventors of the present invention, in a case of combination of the large-diameter control rod and the hexagonal fuel assembly, possible reactor core construction are that all the large-diameter control rods connected to one control rod drive mechanism are inserted into one hexagonal fuel assembly, and the large-diameter control rods are inserted into all the hexagonal fuel assemblies loaded in a region except for the outermost periphery of the reactor core, and that a plurality of large-diameter control rods connected to one control rod drive mechanism are inserted into three hexagonal fuel assemblies, and the large-diameter control rods are inserted into all the hexagonal fuel assemblies loaded in a region except for the outermost periphery of the reactor core.

Both of the reactor core structures can secure the reactor shut-down margin, and the former can reduce number of assemblies loaded to the reactor core by making the fuel assembly large in size, and the latter can reduce number of the control rod drive mechanisms. Further, according to the studies of the inventors of the present invention, in a case of combination of the square fuel assembly and the large-diameter control rod, the reactor core structure of closely arranging the fuel rods in a regular triangular lattice configuration can be realized.

Further, according to the studies of the inventors of the present invention, when the fissionable plutonium enrichment of the fuel rods in the fuel assembly in the combination of the fuel assembly having the hexagonal or square transversal cross section and the large-diameter control rod, power peaking occurs in the fuel rod adjacent to the guide tube or the fuel rod in a region most distant from the center of the fuel assembly. Therefore, the power distribution in the assembly can be flattened by making the fissionable plutonium enrichment of the fuel rods in these regions smaller than the fissionable plutonium enrichment of the fuel rods in the other regions.

Furthermore, the above-mentioned fourth effect is produced by the following action. According to the studies of the inventors of the present invention, by appropriately arranging the fuel assemblies or appropriately configuring the orifices in the reactor core, the power and the flow rate of the fuel assemblies in the reactor core can be flattened and accordingly the thermal margin can be improved. The reactor core except for the outermost periphery of the reactor core is radially divided into two equal-area regions, and fuel assemblies are loaded so that an average value of number of cycles staying in the reactor core of the fuel assemblies loaded in the outer core region is smaller than an average value of number of cycles staying in the reactor core of the fuel assemblies loaded in the inner core region. By doing so, the neutron infinite multiplication factor in the outer region of the reactor core can be made higher than that in the inner region, and accordingly the power distribution in the radial direction of the reactor core can be flattened. By loading assemblies having larger number of cycles staying in the reactor core in the outermost region of the reactor core having lower neutron importance, the required fissionable plutonium enrichment can be reduced.

According to the studies of the inventors of the present invention, the effect of neutron leakage out of the reactor core peripheral portion is particularly large on the fuel assemblies in the outermost layer of the reactor core and adjacent to the outermost layer, and as a result the output power of the fuel assemblies in these region becomes lower compared to that of the assemblies in the other regions and consequently the coolant flow rate of the fuel assemblies in these region is increased. Therefore, the flow distribution can be flattened by that the average value of orifice pressure drop coefficient of the fuel assemblies in an outermost periphery of the reactor core and adjacent to the outermost periphery is set so as to be larger than the average value of orifice pressure drop coefficient of the fuel assemblies in the other regions. By doing so, the coolant flow rate near the outermost periphery of the reactor core can be reduced, and accordingly the total coolant flow rate can be reduced. In addition, since the steam void fraction can be increased in the region having the large orifice pressure drop coefficient, which can contribute to improvement of the void coefficient and increase of the breeding ratio.

Furthermore, the above-mentioned sixth effect is produced by the following action. According to the studies of the inventors of the present invention, although the breeding ratio can be made larger than 1.0 by employing light water steam cooling, there are problems in that it is necessary to develop a material having a high-temperature resistance and strength higher than that of the material used in the existing BWR and in that radioactive nuclides such as corrosion products flow out of the reactor core together with the steam. In the present invention, by suppressing the mass steam quality at the reactor core exit below 40 wt %, the coolant is maintained in a saturation temperature two-phase state and at the saturation temperature even when the output power is increased by an abnormal transient event. Therefore, the same structural material as in the existing light water reactor can be used, and the reactor core having a breeding ratio above 1.0 can be realized while the radioactive nuclides such as corrosion products is prevented from being contained in the steam flowing to the turbine.

Furthermore, the above-mentioned first and seventh effects are produced by the following action. With aiming at the long-term stable energy supply, description will be made on the fuel which is enriched by adding plutonium to depleted uranium produced as the residue at manufacturing enriched uranium used for the existing light water reactors. However, at present time, there still exist large amounts of natural uranium and degraded uranium recovered from used fuel. According to the studies of the inventors of the present invention, using the fuel which is enriched by adding plutonium to natural uranium or the degraded uranium or low enriched uranium (0.71 wt % to 2.0 wt %) instead of the depleted uranium, it is possible to realize a reactor core having performance in regard to the breeding ratio and the void coefficient prior to the reactor core using the fuel which is enriched by adding plutonium to the depleted uranium by lowering the fissionable plutonium enrichment by approximately 0.5 wt % or more compared to the case of using the fuel which is enriched by adding plutonium to the depleted uranium.

Furthermore, the above-mentioned eighth effect is produced by the following action. According to the studies of the inventors of the present invention, by adding not only the plutonium to the depleted uranium but also adding the actinodes to the depleted uranium at a time, the long-life radioactive nuclides are brought in an equilibrium state in the reactor core and the amount of the long-life radioactive nuclides becomes constant. Therefore, in the reactor core in accordance with the present invention, the amount of increased actinides can be made zero by balancing the generating amount and the eliminating amount. Therefore, it is possible to realize a nuclear reactor system which is capable of enclosing the long half life actinides, one of the most problem nuclides among the radioactive wastes, only in the nuclear reactor, the reprocessing facility and the fuel manufacturing facility.

DESCRIPTION OF THE PREFERRED EMBODIMENTS

Embodiment of the present invention will be described below in detail, referring to the accompanied figures.

Although the reactor cores of electric power of 1350 MW class are described in the following embodiments, the output power capacity is not limited to 1350 MW. It should be recognized that the present invention may be applied to the reactor cores having the other output power capacity by changing number of the fuel assemblies.

(First Embodiment)

Figure 1:
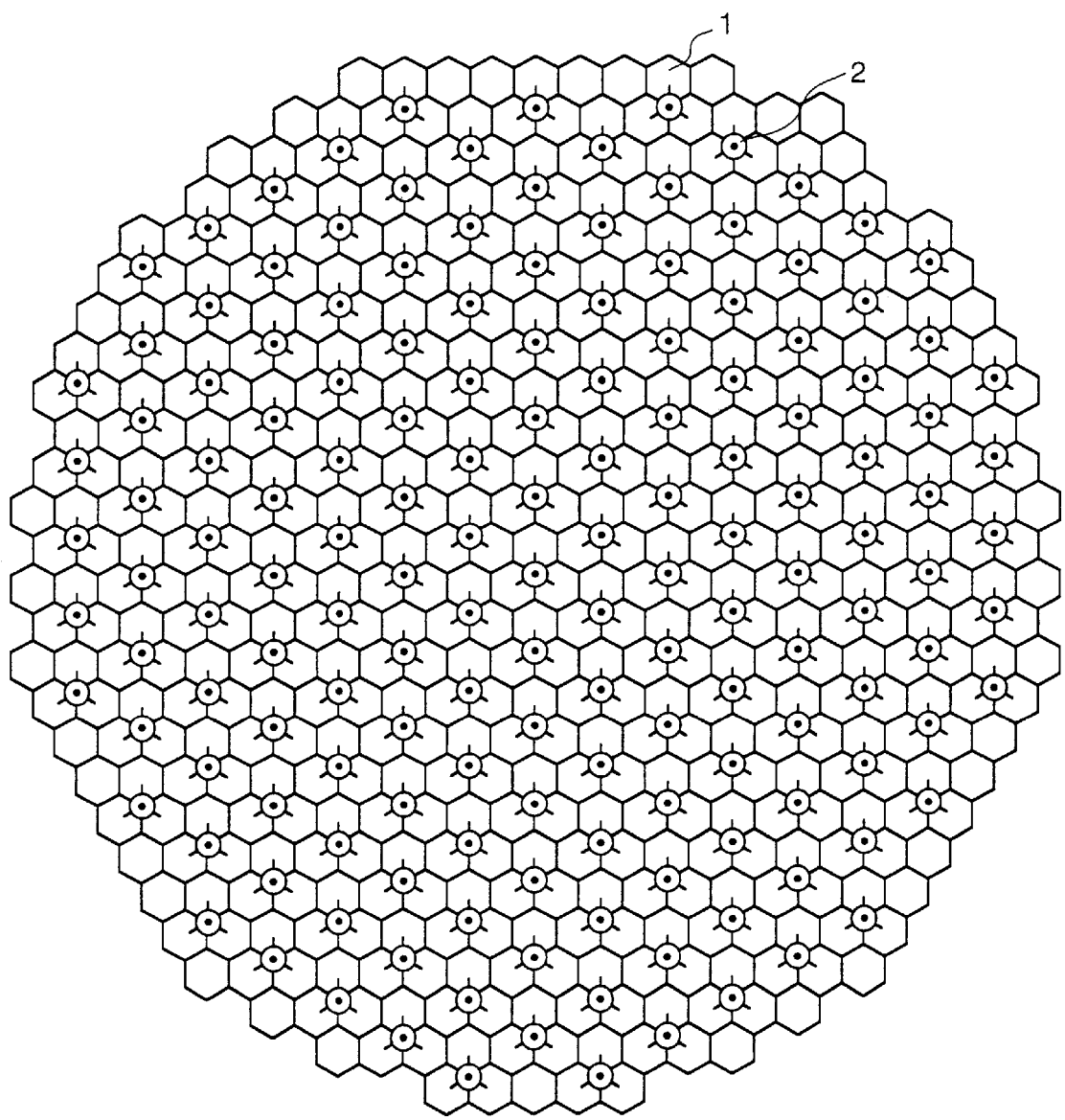
FIG. 1 is a cross-sectional plan view showing a first embodiment of a reactor core in accordance with the present invention.
Figure 2:
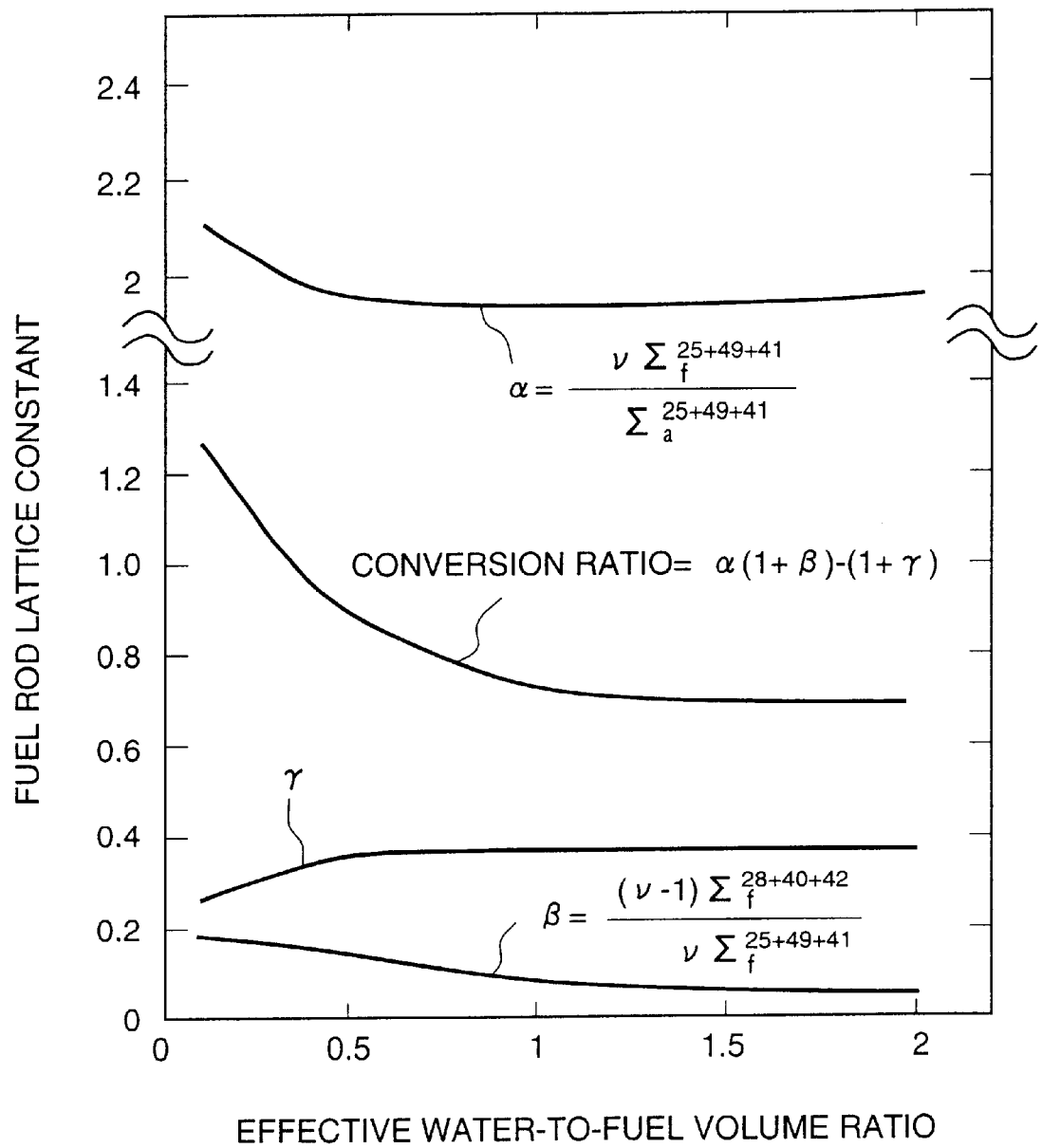
FIG. 2 is a graph showing the relationship between fuel rod lattice constant necessary for expressing a conversion ratio and effective water-to-fuel volume ratio.
Figure 3:
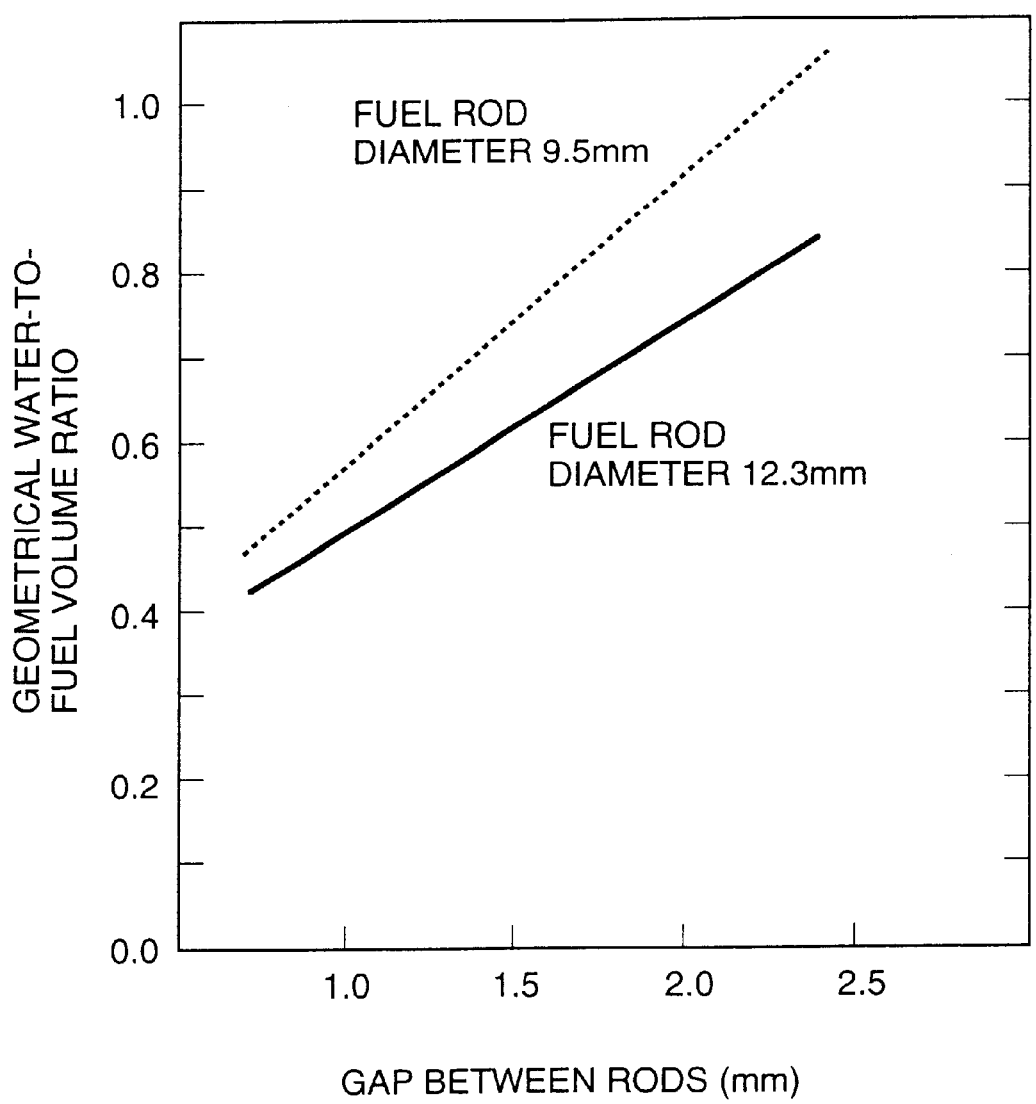
FIG. 3 is a graph showing the relationship between gap between rods and geometrical water-to-fuel volume ratio.
Figure 4:
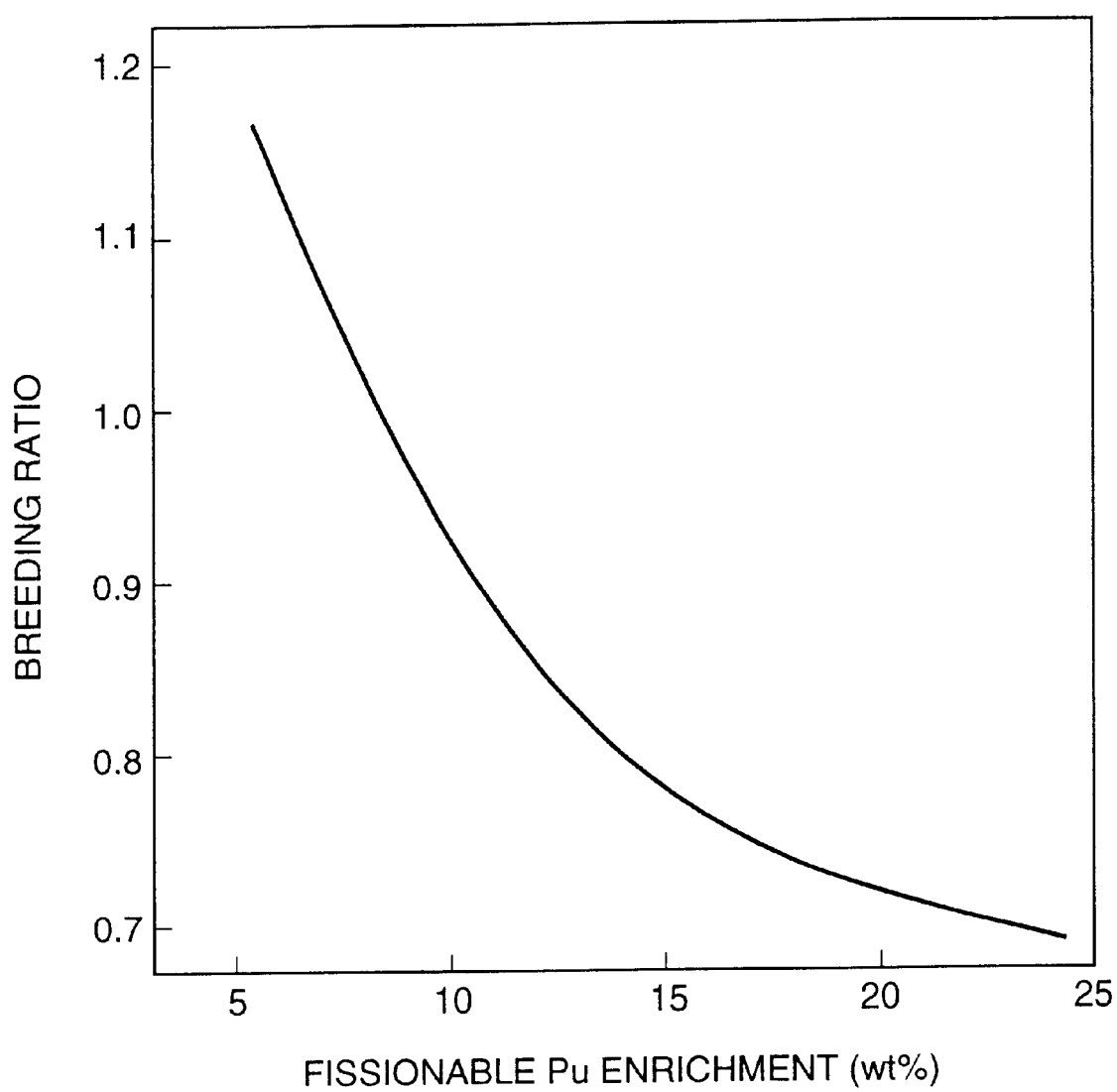
FIG. 4 is a graph showing the relationship between fissile PU enrichment and breeding ratio.
Figure 5:
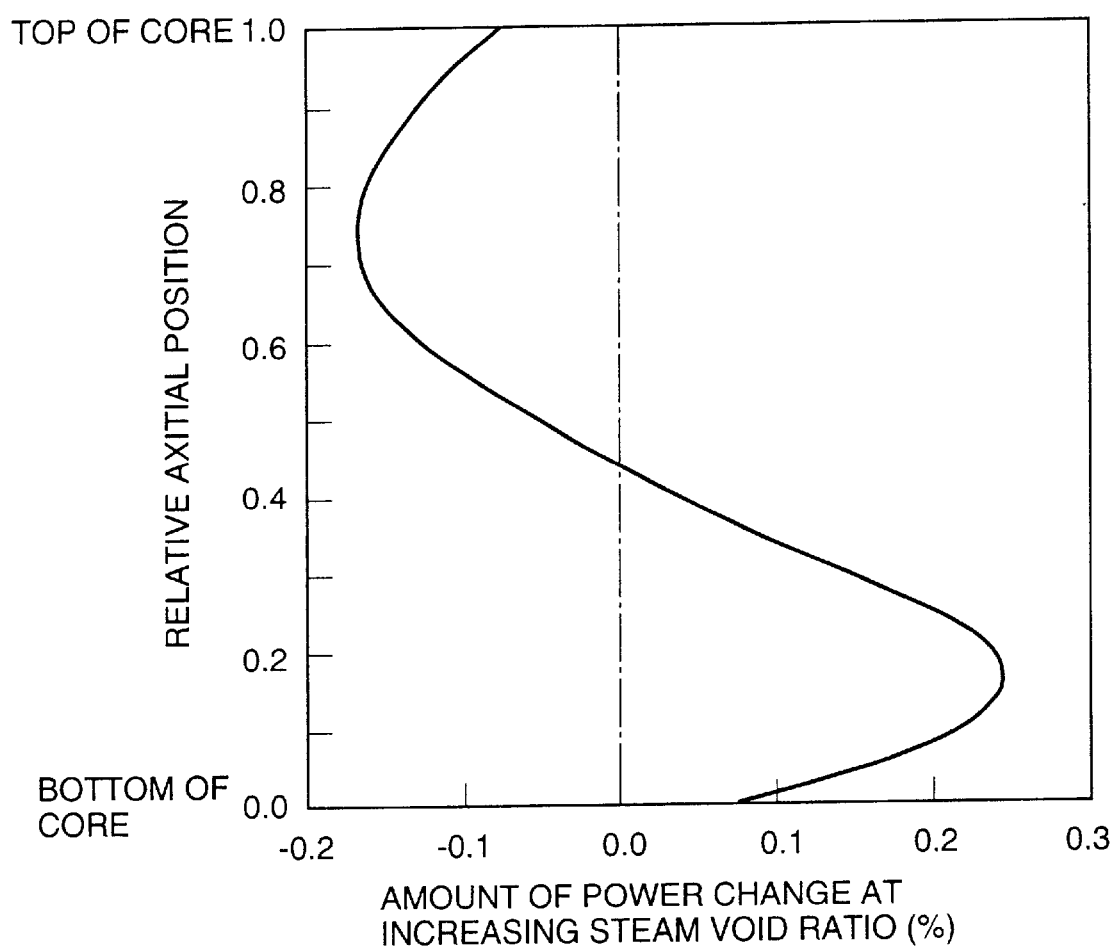
FIG. 5 is a graph explaining change in an output power distribution when a steam void fraction is increased.
Figure 6:
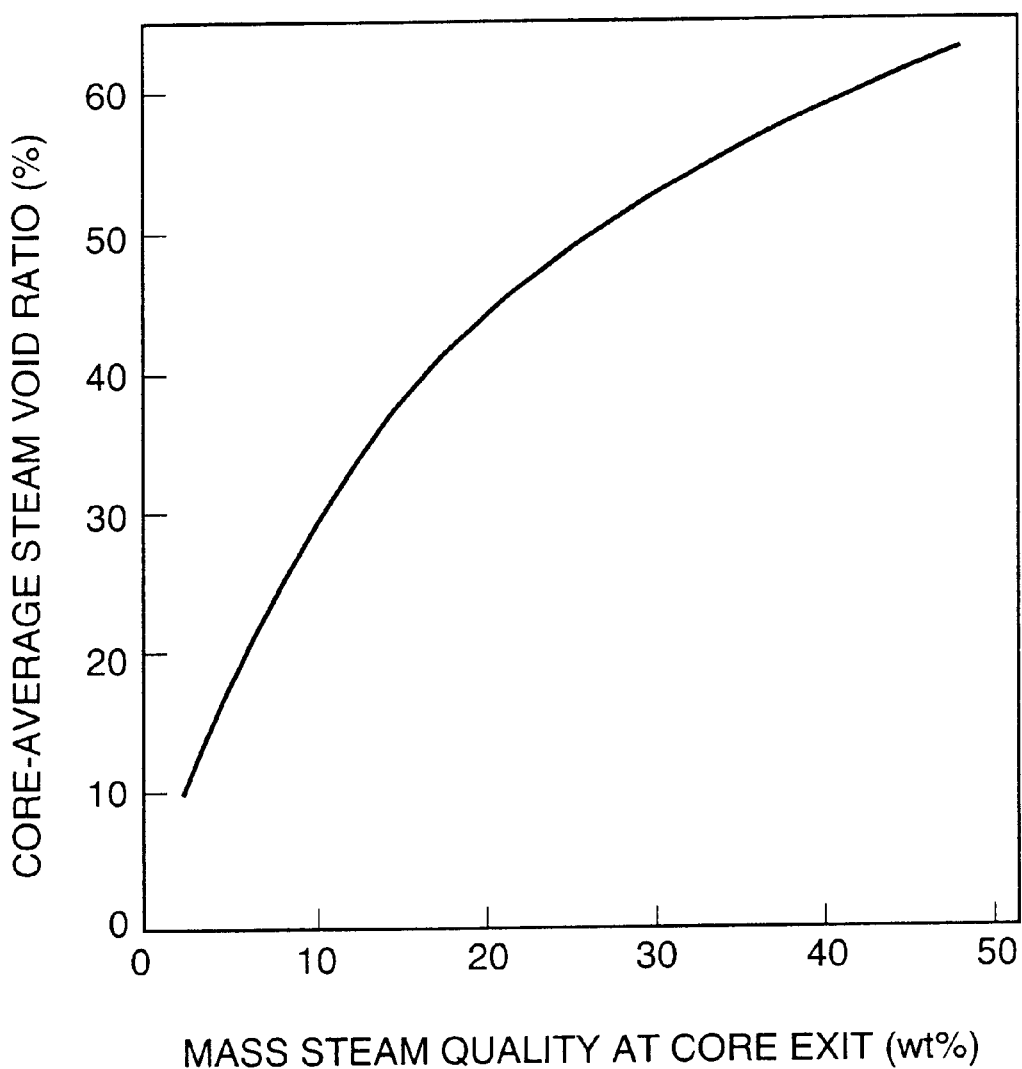
FIG. 6 is a graph showing the relationship between core-averaged seam void fraction and mass steam quality at a reactor core exit.
Figure 7:
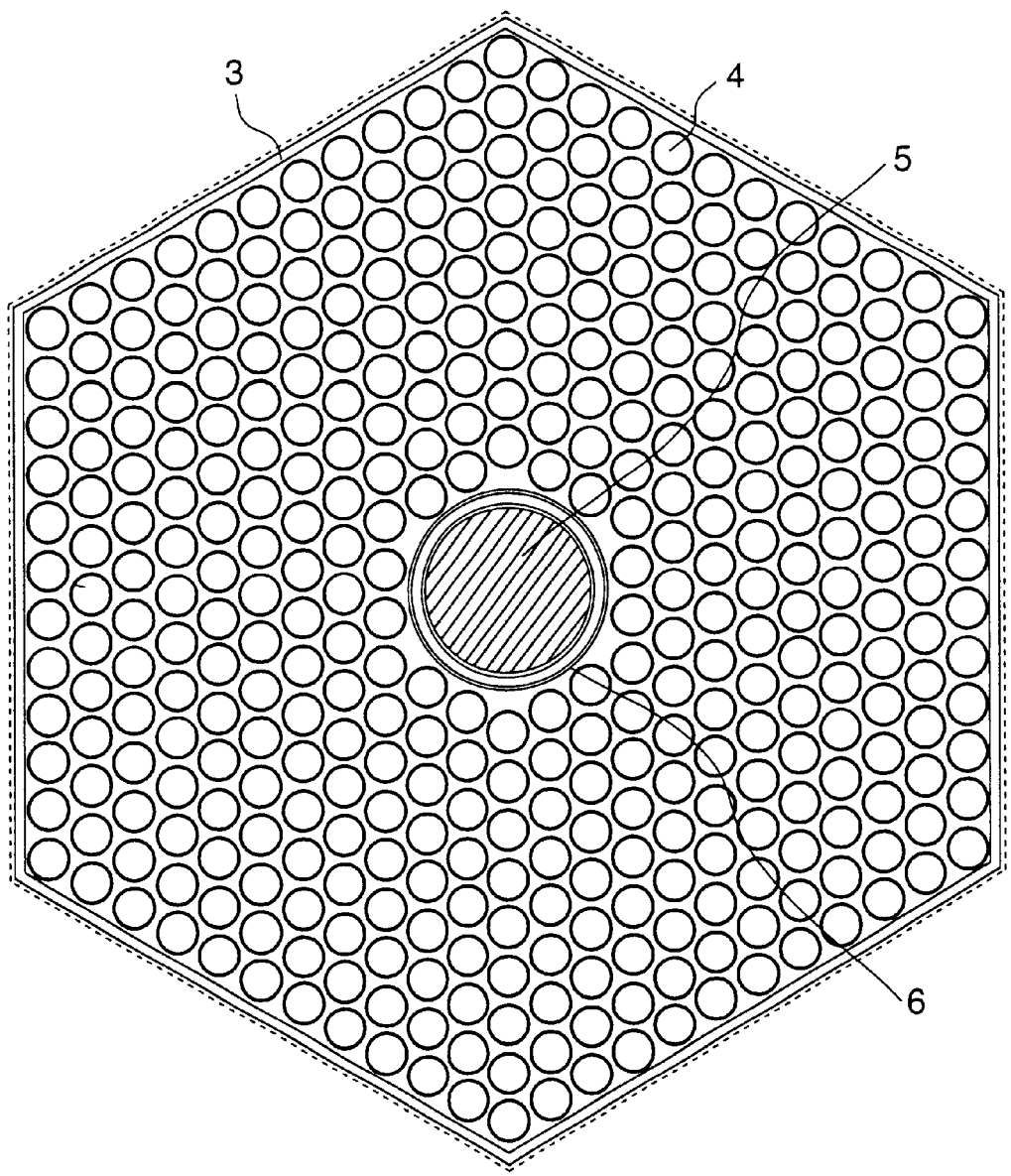
FIG. 7 is a cross-sectional plan view showing a fuel assembly to be loaded to the reactor core.

A first embodiment of the present invention will be described, referring to FIG. 1 and FIG. 7 to FIG. 12. FIG. 1 is a cross-sectional plan view showing the first embodiment of a reactor core having an electric output power of 1356 MWe. FIG. 1 shows 504 fuel assemblies 1; and 157 control rod drive mechanisms 2 each of which operates three large-diameter control rods to be inserted into three fuel assemblies, respectively. FIG. 7 shows the cross section of the fuel assembly lattice. In a channel box 3, fuel rods 4 of 10.1 mm diameter are arranged in a regular triangular configuration with a 1.3 mm gap between the rods to form an equilateral hexagonal assembly having 12 fuel rod rows. In the central portion of the fuel assembly, a guide tube 6 to insert the large-diameter control rod 5 thereinto is disposed in the region having an area equivalent to 3 fuel rod layers, that is, an area equivalent to 19 fuel rod unit lattice cells. The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water.

Figure 8:
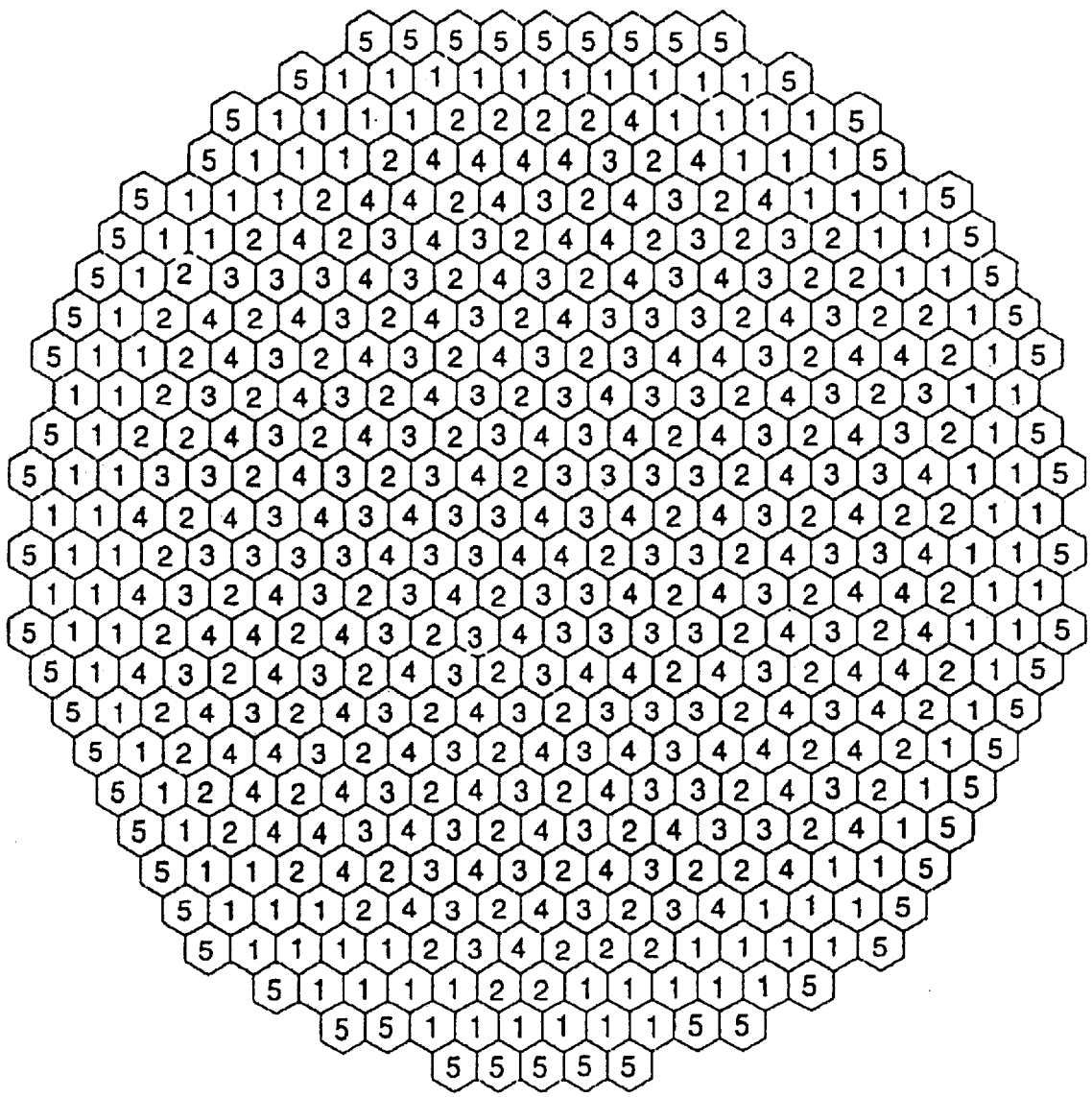
FIG. 8 is a view showing an arrangement of fuel assemblies in the embodiment of the reactor core shown FIG. 1 under the equilibrium core state.
Figure 9:
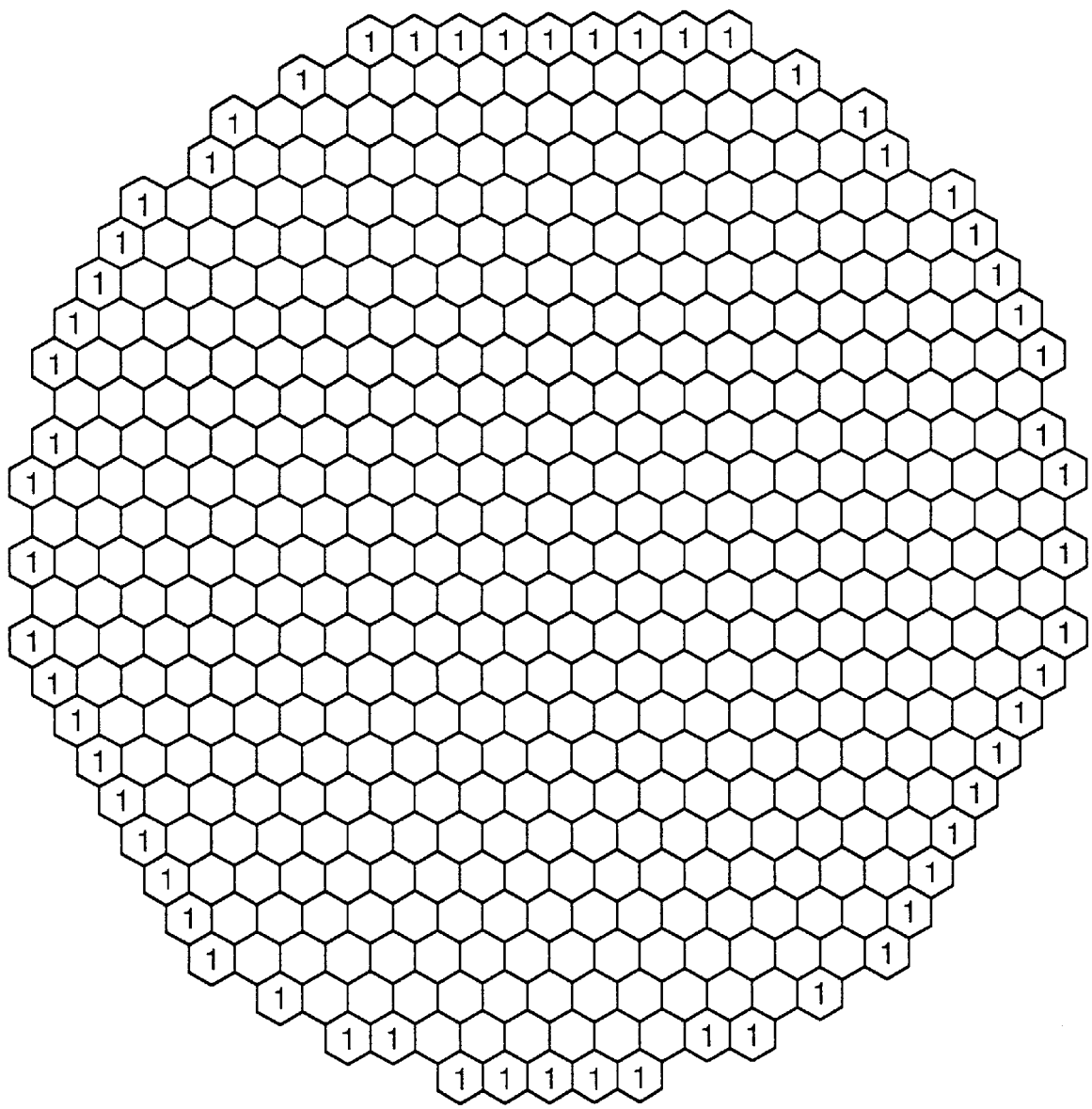
FIG. 9 is a view showing an orifice distribution in the embodiment of FIG. 1.

FIG. 8 shows an arrangement of fuel assemblies under the equilibrium core state. Each of the numerals written in each of the fuel assemblies 1 indicates a period staying in the reactor core by cycle numbers. The 5 cycle fuels staying in the reactor core for the longest period are loaded in the outermost periphery of the reactor core where the neutron importance is low. The fuels of 1 cycle staying period in the reactor core having the highest neutron infinite multiplication factor are loaded in the outer region of the reactor core in the inner side of the outermost periphery to flatten the power distribution in the radial direction of the reactor core. In the inner region of the reactor core, the fuels of 2 to 4 cycle staying periods in the reactor core are distributively loaded to flatten the power distribution in the radial direction of the reactor core. FIG. 9 shows an orifice distribution in the equilibrium reactor core state, and the numeral written in the fuels indicates difference in opening degree of an orifice placed in the fuel supporting portion, and there are two regions for the orifice opening degree. The orifice diameter in the reactor outermost peripheral region (number 1) where the fuel assembly power is small is smaller than the orifice diameter in the inner region.

Figure 10:
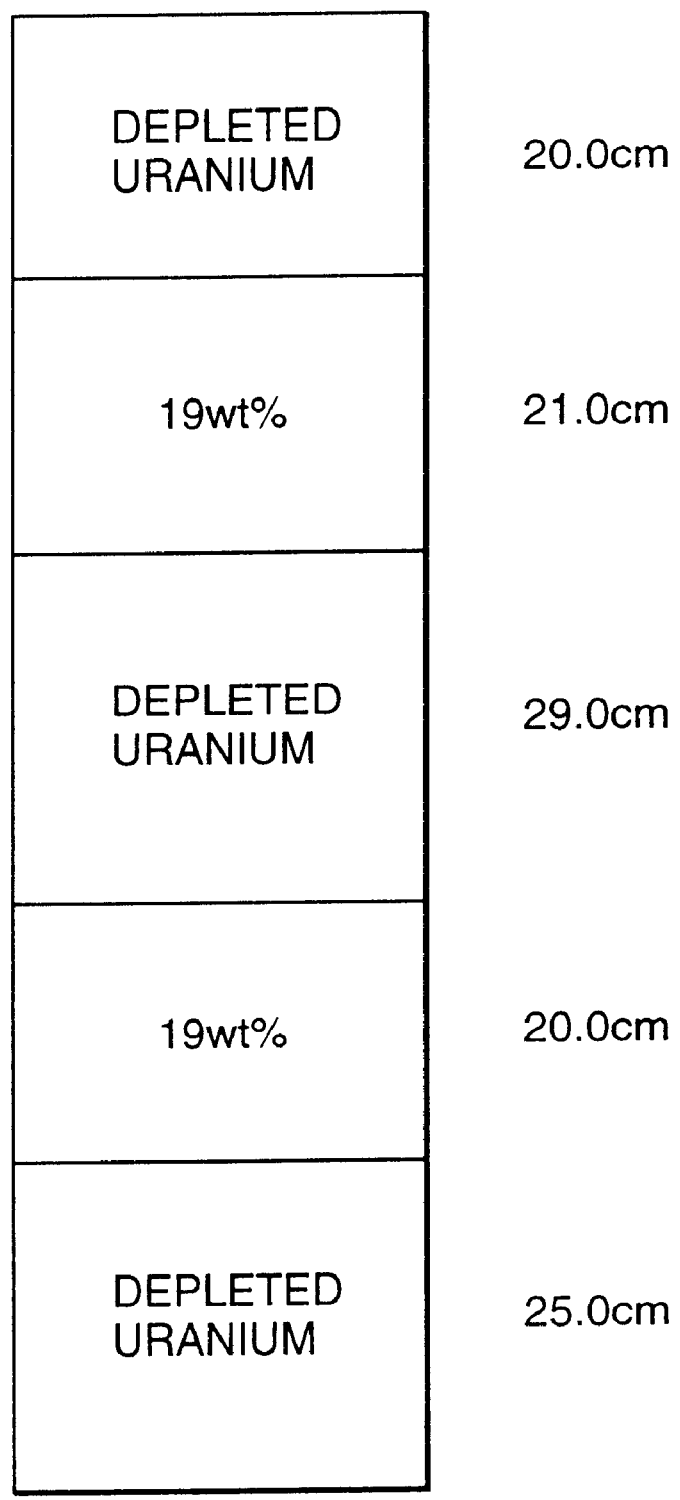
FIG. 10 is a view showing the distribution of enrichment in the axial direction of a fuel assembly to be loaded to the reactor core of FIG. 1.
Figure 11:
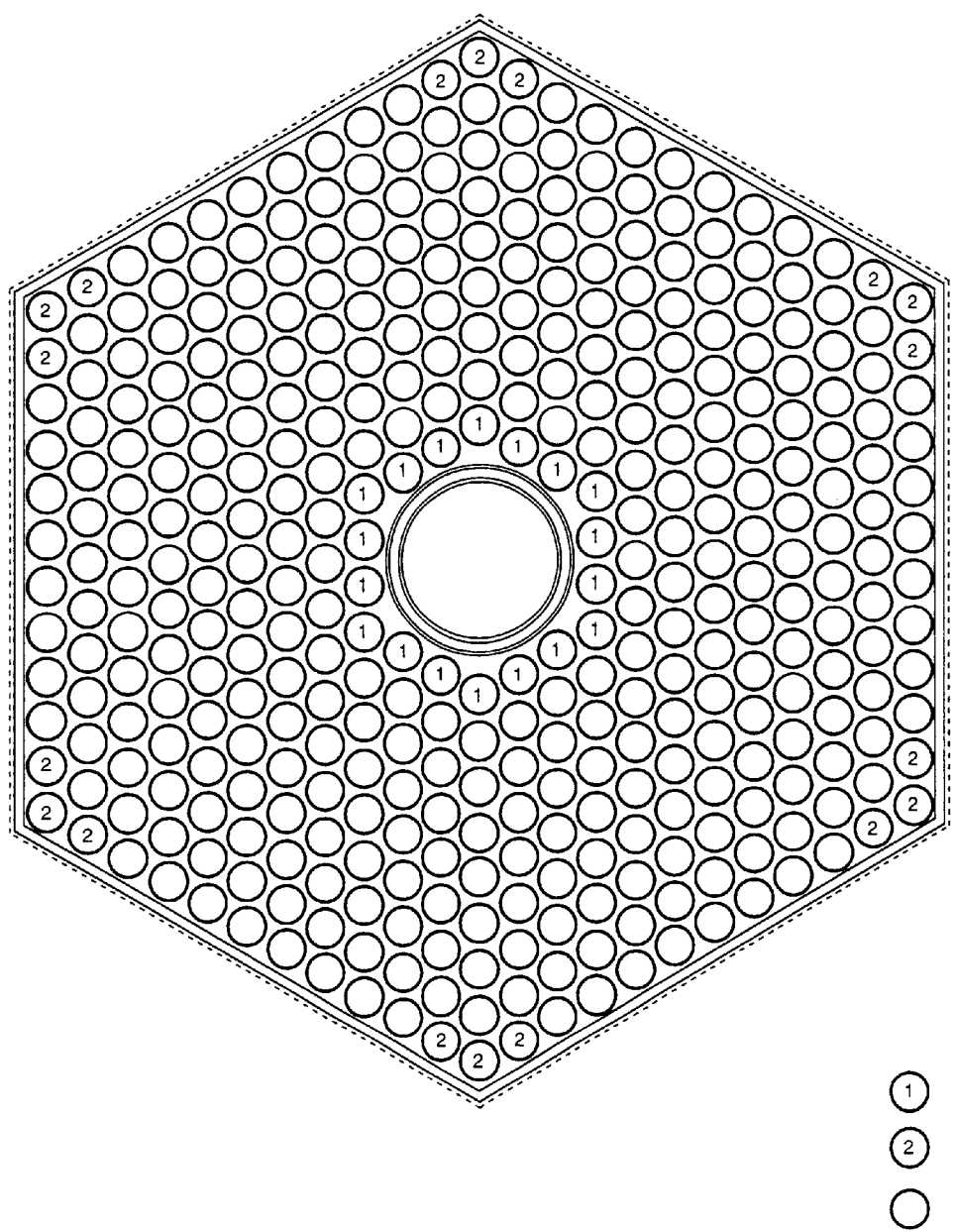
FIG. 11 is a view showing the distribution of enrichment of fuel rods in the fuel assembly to be loaded to the reactor core of FIG. 1.
Figure 12:
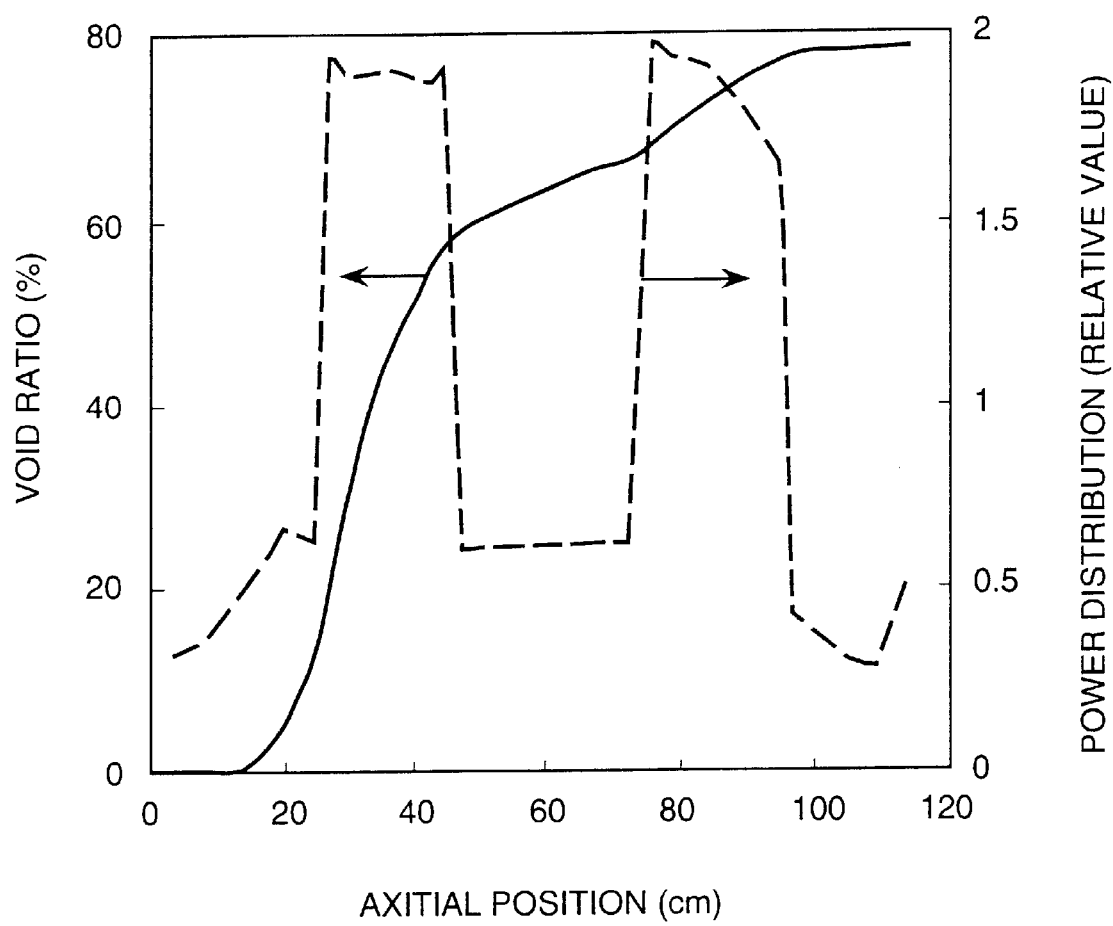
FIG. 12 is a graph showing the distributions of output power and void fraction in the axial direction of the reactor core in the embodiment of FIG. 1.

FIG. 10 shows the axial distribution of fissionable plutonium enrichment averaged over the horizontal cross section of the fuel assembly for the equilibrium reactor core. Therein, the uranium to be added with plutonium is the depleted uranium. The height of the reactor core is 70 cm, and the reactor core is divided three regions at the levels of 20 cm and 49 cm from the bottom end of the reactor core, and the fissionable plutonium enrichments are 19 wt %, 0 wt % and 19 wt %, respectively, and the average fissionable plutonium enrichment is 11.1 wt %. Further, depleted uranium blankets having heights of 20 cm and 25 cm are attached to the top and the bottom of the reactor core portion, respectively. FIG. 11 is a horizontal cross-sectional view showing the 19 wt % fissionable plutonium enrichment region of the fuel assembly. The fissionable plutonium enrichments are three kinds of 19.1 wt %, 18.5 wt % and 17.5 wt %, and the average enrichment is 19 wt %. FIG. 12 shows the distributions of core-average output power and core-average void fraction in the axial direction of the reactor core. The core-average void fraction is 60%, and the mass steam quality at reactor core exit is 32 Wt %.

Operation of the present embodiment will be described below. By the combination of the regular triangular lattice closed-compact hexagonal fuel assembly having a gap between rods of 1.3 mm, the core-average void fraction of 60% and the large-diameter control rod, an effective water-to-fuel volume ratio of 0.27 was attained, and an in-core breeding ratio of 0.87, a blanket breeding ratio of 0.14 and a total breeding ratio of 1.01 were realized. That is, in the present embodiment, by reducing the effective water-to-fuel volume ratio from nearly 2.0 in the existing reactor to 0.27, the light water reactor having the breeding ratio of 1.01 is realized.

The output power of the present reactor core is 1350 MWe which is equal to that of the existing ABWR, and the circumscribed radius of the reactor core is 2.9 m which is nearly equal to that of the ABWR. The height of the reactor core is 70 cm, and the blankets having heights of 20 cm and 25 cm are attached to the top and the bottom of the reactor core to form a short-length fuel assembly. However, since the fuel rods are closely packed, the total length of the fuel rod is nearly equal to that of ABWR fuel and the MCPR is 1.31 which sufficiently satisfies the thermal design standard value of 1.24. Because of the short-length fuel rods having the 70 cm reactor core portion, the plutonium inventory converted to the amount of fissionable plutonium per 1000 MWe output power is as small as 6.0 tons though the fuel rods are closely packed. Even including the period of plutonium staying outside the reactor core such as fuel reprocessing, the plutonium inventory is less than 10 tons per 1000 MWe.

From the above reason, in the present embodiment having the breeding ratio of 1.01, using fissionable plutonium of 15 thousands tons and depleted uranium of 15 million tons produced from uranium reserves of 15 million tons in the world, 1500 units of 1000 MWe reactors can be continued to be operated for 10 thousands years and accordingly the system of long-term stable energy supply can be established.

In the present embodiment, in regard to the height direction of the fuel assembly, there are the portions having the fissionable plutonium enrichment of 19 wt % in the upper and the lower positions, and the middle portion between them is formed of depleted uranium not containing the fissionable plutonium. When the output power is increased or when the core coolant flow rate is decreased, the steam void fraction in the reactor core is increased. At that time, the power distribution in the upper portion of the reactor core is swung to the middle region of the reactor core where the fissionable plutonium enrichment is not contained. Thereby, the negative void coefficient is inserted. Further, in the present embodiment, since the mass steam quality at the reactor core exit is 32 wt %, and accordingly all the coolant does not become vapor and the coolant can be maintained in a two-phase state even when an abnormal transient event occurs. Therefore, similar to the existing BWR, the radioactive substances accumulated in the reactor core such as corrosion products are enclosed in the reactor core by evaporation operation of boiling and prevented from being transported to the turbine side.

From the above reason, the BWR of the present embodiment is capable of cope with the long-term stable energy supply under the degree of safety comparative with that of the fuel burning-only light water reactor under operation now and using the pressure vessel having a size nearly equal to that of the ABWR under construction now. The BWR of the present embodiment outputs the amount of power equal to that of the ABWR, and can attain burn-up of 65 GWd/t.

A void coefficient of the existing BWR under operation now (a value at present) is $-7.0 \times 10^{-4} \Delta k/k/\%$ void. The value for the present embodiment is designed to be $-0.5 \times 10^{-4} \Delta k/k/\%$ void of which the absolute value is smaller than the value at present. As the result, the thermal margin to an event of increasing pressure or to an event of decreasing coolant temperature is relatively large. From the above reason, the BWR reactor core of the present embodiment has safety margins for various kinds of transient events which are larger than those of the existing BWR under operation now.

In the present embodiment, the large-diameter control rod having an outer diameter larger than that of the fuel rod is employed as the absorption rod. By employing the large-diameter control rod, the mechanical strength of the control rod can be increased and accordingly bending and buckling of the control rod can be suppressed when the control rod is inserted or withdrawn. Furthermore, by using the large-diameter control rod, number of absorption rods per fuel assembly can be reduced, and accordingly the control rod can be easily manufactured to reduce the manufacturing cost.

According to the present embodiment, by combination of the closed-packed hexagonal fuel assembly, the large-diameter control rod and the core-average void fraction of 60%, the breeding ratio of 1.01 can be realized by the fuel enriched by adding the fissile PU of average 11.1 wt % to the depleted uranium, and 1500 units of 1000 MWe reactors can be operated for 10 thousands years using the uranium reserves of 15 million tons in the world, and accordingly the long-term stable energy supply can be established. Further, since the diameter of the pressure vessel, the operating conditions such as output power and the used materials are the same as those of the existing BWR under operation, the electric power generation cost can be suppressed to the same level as that of the existing BWR even though the performance is largely progressed. Further, by employing the large-diameter control rod, maintaining the negative void coefficient by the axial fuel distribution and suppressing the mass steam quality to nearly 32 wt %, the safety margin can be secured in the same level as that of the existing BWR by maintaining the evaporating function by boiling to enclose the radioactive substances in the pressure vessel.

In the present embodiment, aiming at the long-term stable energy supply, the description has be made on the construction, the operation and the effects of the fuel which is enriched by adding plutonium to depleted uranium produced as the residue at manufacturing enriched uranium used for the existing light water reactors. However, the same or more effects can be obtained by the fuel enriched by adding plutonium to natural uranium or the degraded uranium recovered from used fuel or the low enriched uranium instead of the depleted uranium. In this case, the fissile PU enrichment can be reduced by 0.5 wt % or more compared to the case of using the depleted uranium due to increase in an amount of uranium-235 contained in the fuel. As a result, the breeding ratio to the fissile PU can be increased by nearly 3% or more, and the void coefficient can be made negative. In addition, since the Pu inventory can be reduced, number of the RBWRs capable of being operated can be further increased.

Although the void coefficient is negative in the present embodiment, the power coefficient including the Doppler coefficient can be made negative even if the void coefficient is 0 or slightly positive. According to the study of the inventors of the present invention, it has been shown from an evaluation result on the safety that the negative or positive void coefficient is essentially no problem if the power coefficient is negative. Therefore, the thermal margin can be increased by increasing the length of the reactor core portion. Further, the breeding ratio can be increased by narrowing the gap between the fuel rods.

Although only the fuel enriched by adding Pu to uranium has been described in the present embodiment, the other actinides can be added together with Pu. In this case, since the RBWR is high in the average energy of neutrons, plutonium is hardly converted to actinides having higher mass numbers and at the same time the actinides can be eliminated by nuclear fission reaction. Furthermore, in the present embodiment, there are the portions having the same fissionable plutonium enrichment in the upper and the lower portions, and the middle portion between them is formed of depleted uranium not containing the fissionable plutonium. However, it is not always necessary that the fissionable plutonium enrichments in the upper and the lower portions is equal to each other. Further, the depleted uranium region is arranged in the position slightly higher than the middle position of the reactor core in the present embodiment, but it is not limited to that position. The values of axial power peaking can be made equal by combining the fissile PU enrichments in the upper and the lower portions and the position of the depleted uranium region.

(Second Embodiment)

Figure 13:
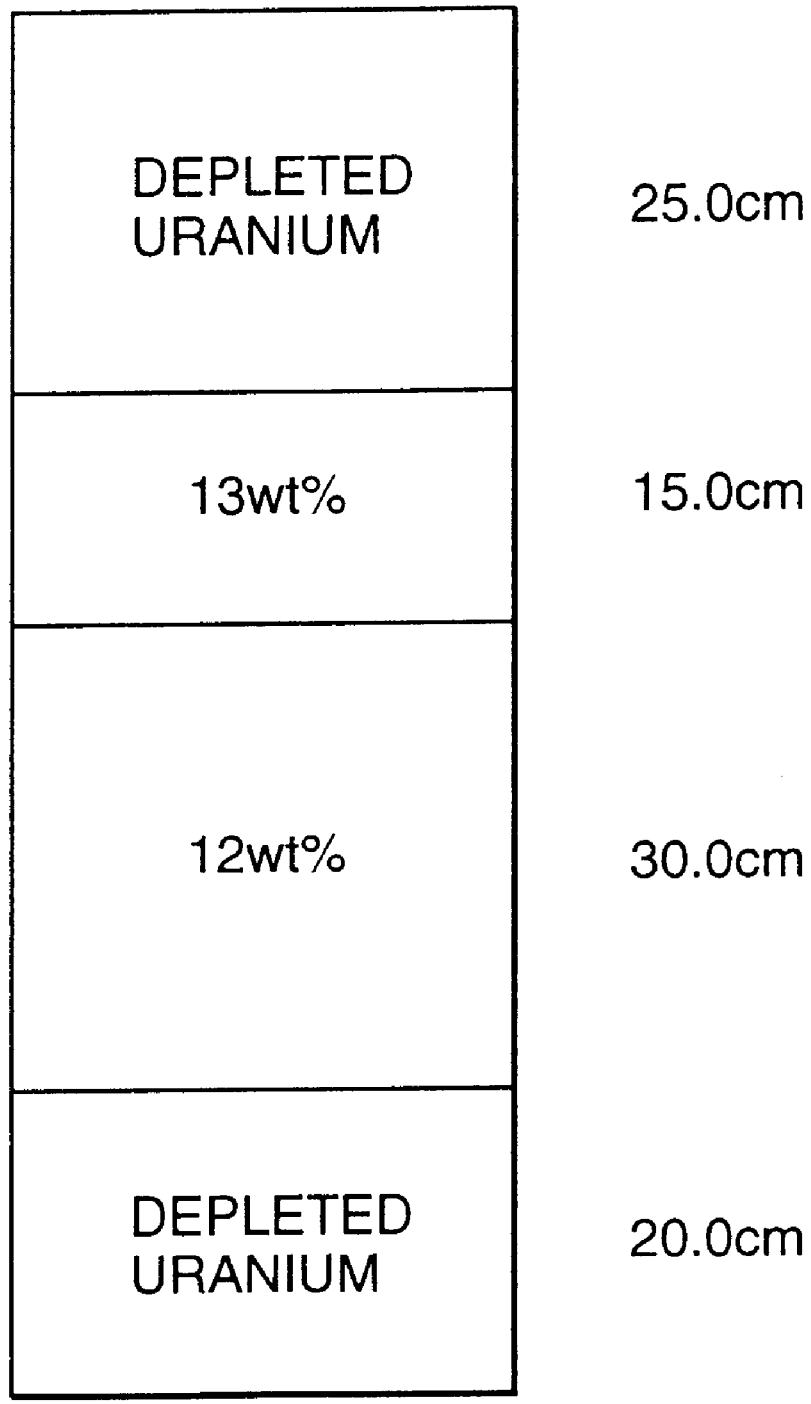
FIG. 13 is a view showing the distribution of enrichment in the axial direction of a fuel assembly to be loaded to a second embodiment of a reactor core in accordance with the present invention.

A second embodiment of the present invention will be described below, referring to FIG. 13. The present embodiment is a reactor core of an electric power output of 1356 MWe, and has further shortened fuel assemblies. The horizontal cross section and the cross section of the fuel assembly lattice of the present embodiment are the same as FIG. 1 and FIG. 7 of Embodiment 1, respectively. FIG. 13 shows the axial distribution of fissionable plutonium enrichment averaged over the horizontal cross section of the fuel assembly for the equilibrium reactor core. Therein, the uranium to be added with plutonium is the depleted uranium. The height of the reactor core is 45 cm, and the reactor core is divided two regions at the levels of 8/12 from the bottom end of the reactor core, and the fissionable plutonium enrichment in the upper region is 13 wt % and the fissionable plutonium enrichment in the upper region is 12 wt %. Further, depleted uranium blankets having heights of 25 cm and 20 cm are attached to the top and the bottom of the reactor core portion, respectively.

Operation of the present embodiment will be described below. The construction of the fuel assembly is the same as that of Embodiment 1. By the combination of the regular triangular lattice closed-compact hexagonal fuel assembly having a gap between rods of 1.3 mm, the core-average void fraction of 60% and the large-diameter control rod, an effective water-to-fuel volume ratio of 0.27 was attained, and a breeding ratio of 1.01 was realized.

Comparing with Embodiment 1, in regard to the axial direction of the fuel assembly, the present embodiment does not have the depleted uranium region not containing the fissile PU, and the reactor core portion is as short as 45 cm. Further, in regard to the axial direction of the fuel assembly, the fuel assembly is an upper-and-lower two region fuel having different fissile PU enrichments at the levels of 15 cm from the top end of the reactor core, and the fissionable plutonium enrichment in the upper region is 13 wt % and the fissionable plutonium enrichment in the upper region is 12 wt %. On the other hand, when the steam void fraction in the reactor core is increased, the relative increasing amount of void fraction is large in the lower portion of the reactor core having a lower void fraction than the upper portion of the reactor core already reaching the saturation state. As the result, swing of the neutron flux distribution occurs from the upper portion of the reactor core having a higher neutron importance to the lower portion of the reactor core having a lower neutron importance, and thereby the negative void coefficient is inserted.

The RBWR of the present embodiment outputs the amount of power equal to that of the ABWR, and can attain burn-up of 45 GWd/t using the pressure vessel having a size nearly equal to that of the ABWR under construction now. In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Third Embodiment)

Figure 14:
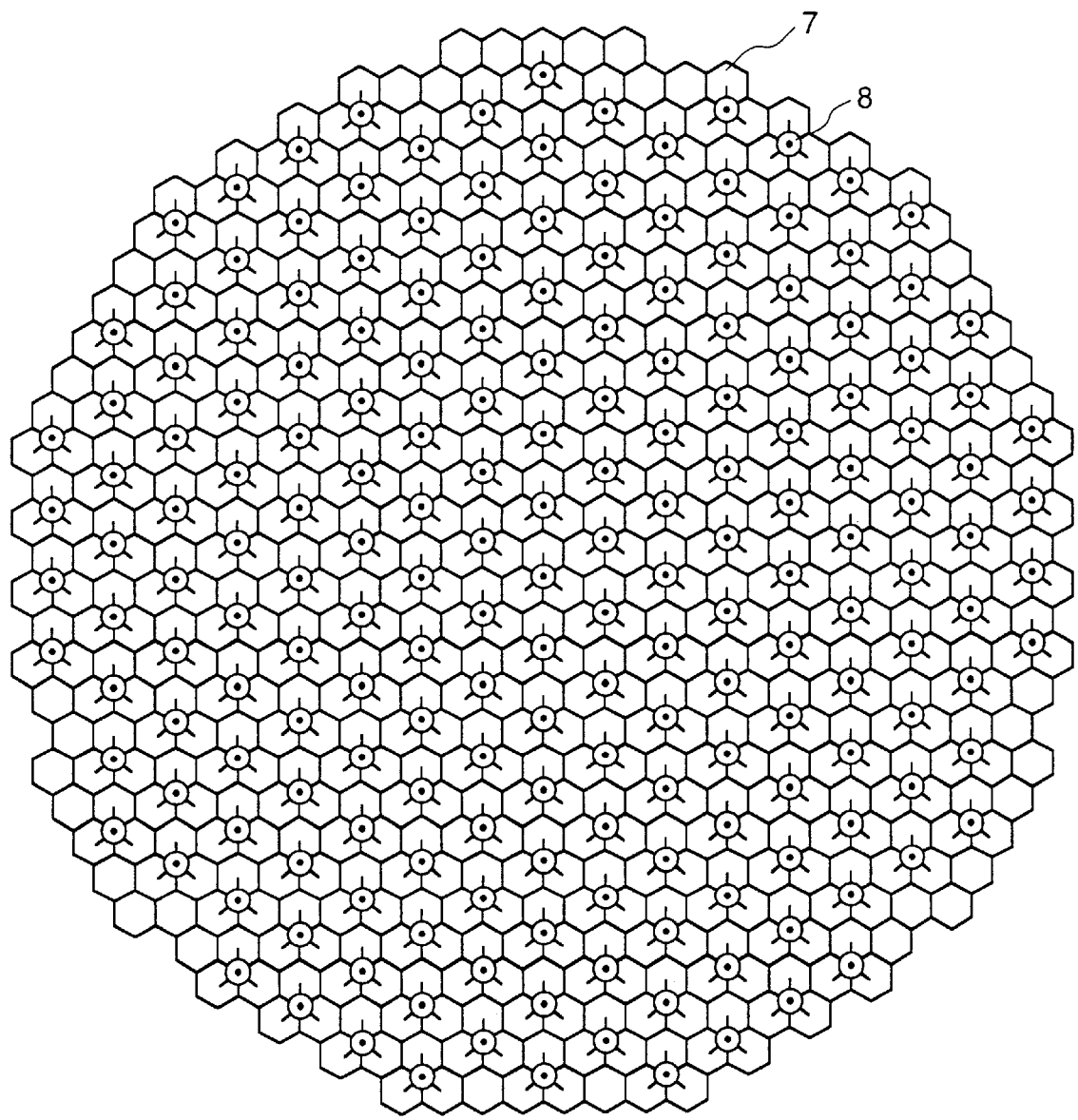
FIG. 14 is a cross-sectional plan view showing a third embodiment of a reactor core in accordance with the present invention.

A third embodiment of the present invention will be described below, referring to FIG. 14 to FIG. 17. The present embodiment is a reactor core in which the electric output power is the same as that of Embodiment 1, and number of fuel assemblies and the structure of the fuel assembly are changed from Embodiment 1. FIG. 14 is a cross-sectional plan view showing the present embodiment of a reactor core having an electric output power of 1356 MWe. FIG. 14 shows 609 fuel assemblies 7; and 193 control rod drive mechanisms 8 each of which operates large-diameter control rods to be inserted into three fuel assemblies.

Figure 15:
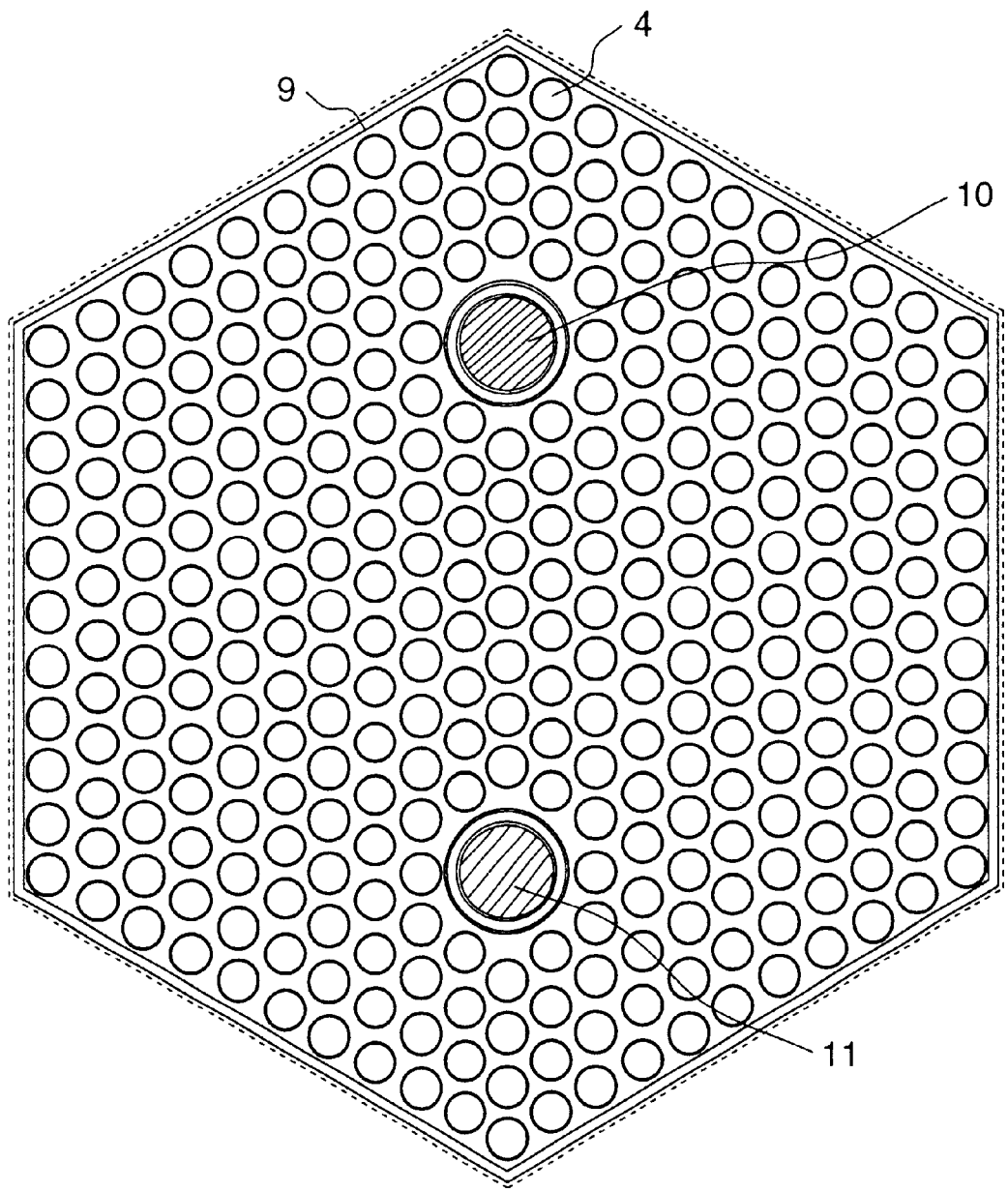
FIG. 15 is a cross-sectional plan view showing a fuel assembly to be loaded to the reactor core of FIG. 14.

FIG. 15 shows the cross section of the fuel assembly lattice. In a channel box 9, fuel rods 4 of 10.1 mm diameter are arranged in a regular triangular configuration with a 1.3 mm gap between the rods to form an equilateral hexagonal assembly having 11 fuel rod rows. At two positions in the fuel assembly, two guide tubes 11 to insert the large-diameter control rods 10 thereinto are disposed in the regions having an area equivalent to 2 fuel rod rows, that is, an area equivalent to 7 fuel rod unit lattice cells. The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water.

Figure 16:
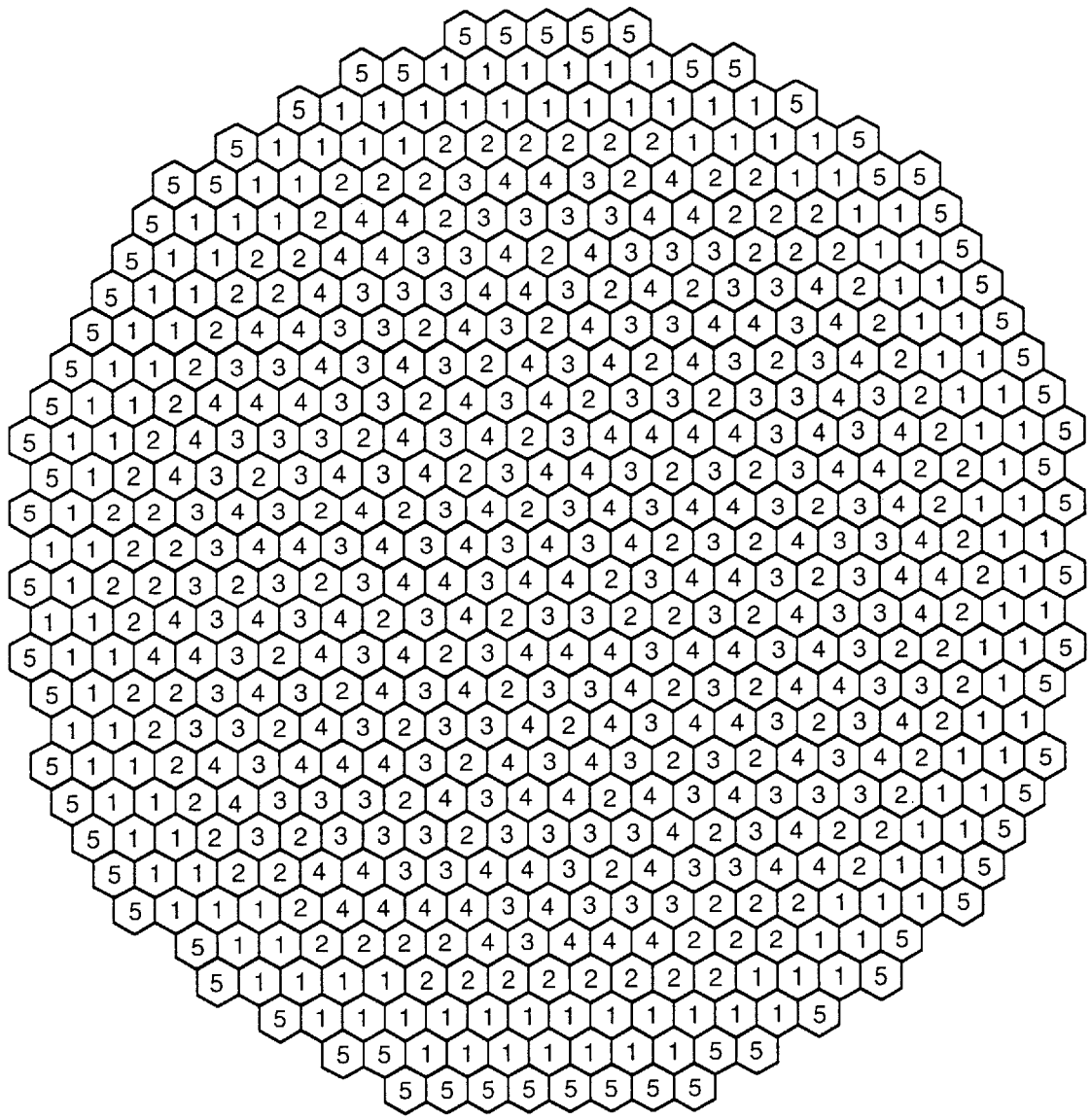
FIG. 16 is a view showing an arrangement of fuel assemblies in the embodiment of the reactor core shown FIG. 14 under the equilibrium core state.

FIG. 16 shows an arrangement of fuel assemblies under the equilibrium core state. Each of the numerals written in each of the fuel assemblies 7 indicates a period staying in the reactor core by cycle numbers. The 5 cycle fuels staying in the reactor core for the longest period are loaded in the outermost periphery of the reactor core where the neutron importance is low. The fuels of 1 cycle staying period in the reactor core having the highest neutron infinite multiplication factor are loaded in the outer region of the reactor core in the inner side of the outermost periphery to flatten the power distribution in the radial direction of the reactor core. In the inner region of the reactor core, the fuels of 2 to 4 cycle staying periods in the reactor core are distributively loaded to flatten the power distribution in the radial direction of the reactor core.

Figure 17:
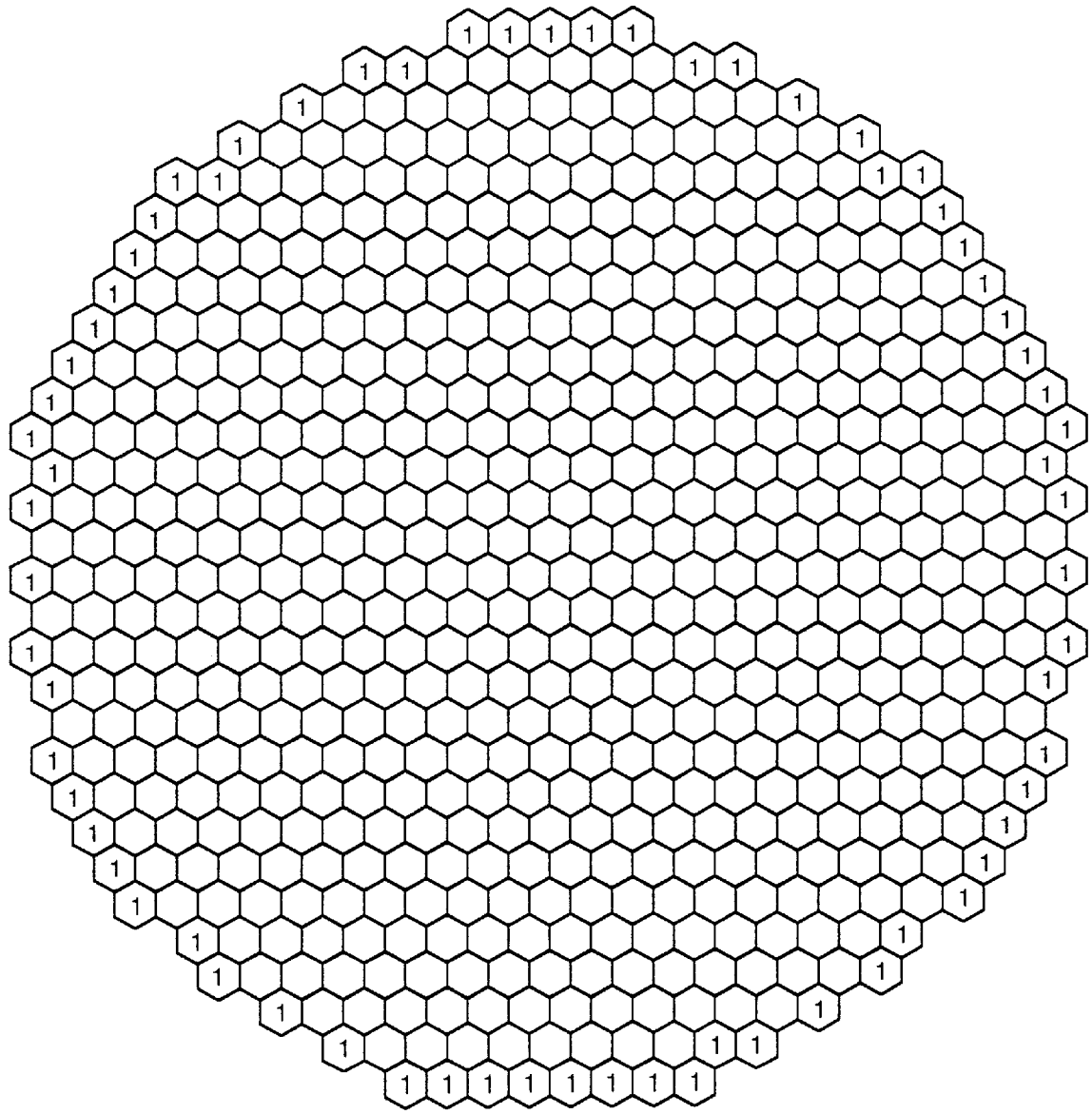
FIG. 17 is a view showing an orifice distribution in the embodiment of FIG. 14.

FIG. 17 shows an orifice distribution in the equilibrium reactor core state, and the numeral written in the fuels indicates difference in opening degree of an orifice placed in the fuel supporting portion, and there are two regions for the orifice opening degree. The orifice diameter in the reactor outermost peripheral region (number 1) where the fuel assembly power is small is smaller than the orifice diameter in the inner region. The axial distribution of the fissile PU enrichment averaged with the horizontal cross section of the fuel assembly is the same as that of FIG. 10 of Embodiment 1.

The area of the region occupied by the control rod in the present embodiment is decreased from one region of 19 fuel rod unit lattice cells to two regions of 7 fuel rod unit lattice cells, but the control rod value is nearly equal to that of Embodiment 1 because the absorption rods are distributively inserted into the fuel assembly. On the other hand, in the present embodiment, number of fuel rods loaded in the reactor core is increased compared to Embodiment 1, and accordingly the average linear power density is reduced to improve the thermal margin. In the present embodiment, by the combination of the regular triangular lattice closed-compact hexagonal fuel assembly, the large-diameter control rod and the core-average void fraction of 60%, an effective water-to-fuel volume ratio of 0.28 is also attained. As the result, the reactor core characteristics are the same as those of Embodiment 1 and the same effect can be obtained.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Fourth Embodiment)

Figure 18:
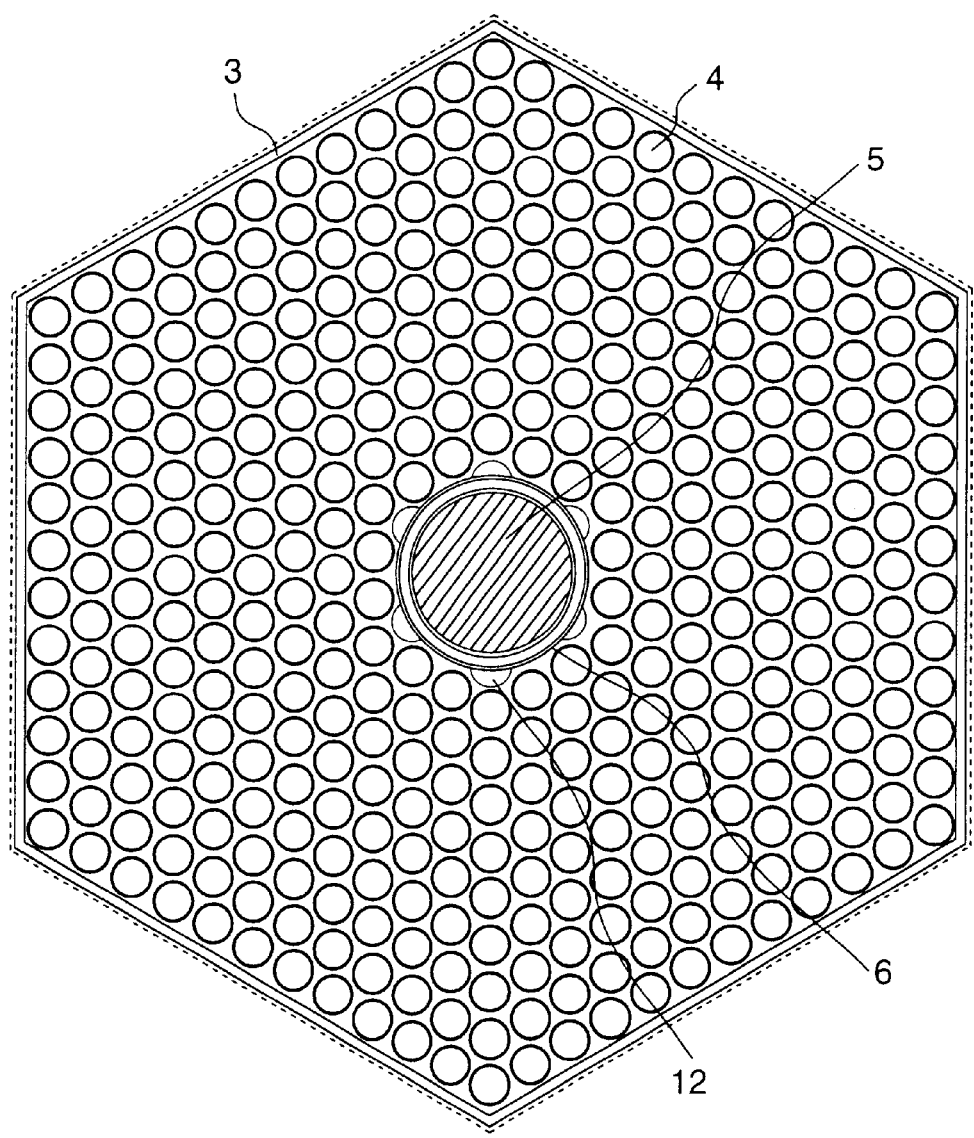
FIG. 18 is a cross-sectional plan view showing a fuel assembly to be loaded to a fourth embodiment of a reactor core in accordance with the present invention.

A fourth embodiment of the present invention will be described below, referring to FIG. 18. The present embodiment is a reactor core of which the reactor core performance is improved on the base of the structure of Embodiment 1. The present embodiment is of 1356 MWe electric output power, and the reactor core cross section is the same as that of FIG. 1 of Embodiment 1. FIG. 18 shows the cross section of the fuel assembly lattice. In a channel box 3, fuel rods 4 of 10.1 mm diameter are arranged in a regular triangular configuration with a 1.3 mm gap between the rods to form an equilateral hexagonal assembly having 12 fuel rod rows. In the central portion of the fuel assembly, a guide tube 6 to insert the large-diameter control rod 5 thereinto is disposed in the region having an area equivalent to 3 fuel rod rows, that is, an area equivalent to 19 fuel rod unit lattice cells. Outside of the guide tube, water excluding rods 12 for excluding the moderator between the guide tube and the fuel rods adjacent to the guide tube are arranged. The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water. All of the configuration of fuel assemblies in the reactor core, the orifice state and the axial distribution of fissionable plutonium enrichment averaged over the horizontal cross section of the fuel assembly for the equilibrium reactor core are the same as FIG. 8, FIG. 9 and FIG. 10 of Embodiment 1, respectively.

In the present embodiment, comparing with Embodiment 1 the effective water-to-fuel volume ratio can be improved and the power peaking in the fuel assembly can be suppressed by excluding the moderator around the guide tube. The reactor core characteristics are the same as those of Embodiment 1 and the same effect can be obtained.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Fifth Embodiment)

Figure 19:
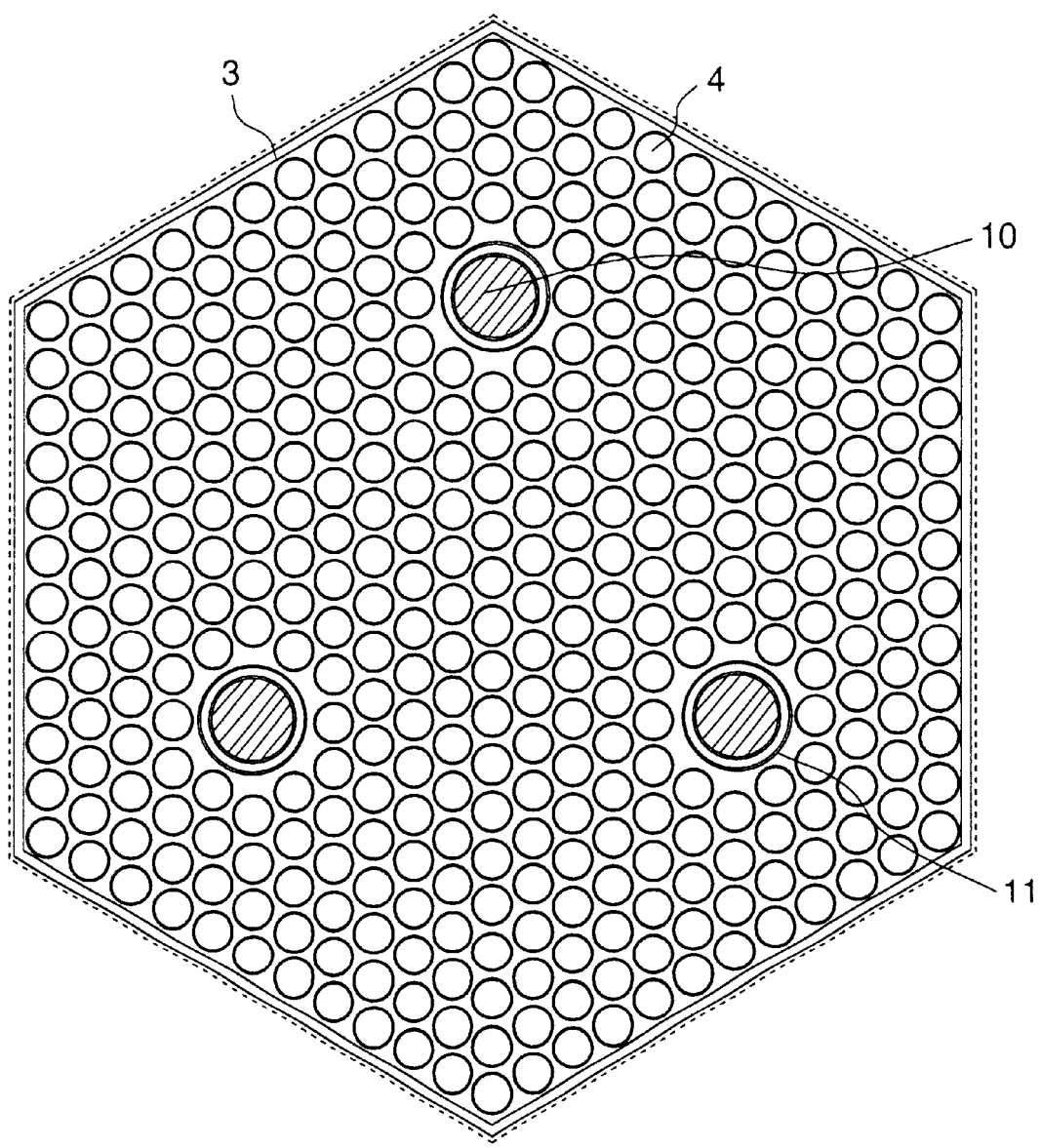
FIG. 19 is a cross-sectional plan view showing a fuel assembly to be loaded to a fifth embodiment of a reactor core in accordance with the present invention.

A fifth embodiment of the present invention will be described below, referring to FIG. 19. The present embodiment is a reactor core of which the reactor core performance is improved on the base of the structure of Embodiment 1. The present embodiment is of 1356 MWe electric output power, and the reactor core cross section is the same as that of FIG. 1 of Embodiment 1. FIG. 19 shows the cross section of the fuel assembly lattice. In a channel box 3, fuel rods 4 of 10.1 mm diameter are arranged in a regular triangular configuration with a 1.3 mm gap between the rods to form an equilateral hexagonal assembly having 12 fuel rod rows.

At three positions in the fuel assembly, three guide tubes 11 to insert the large-diameter control rods 10 thereinto are disposed in the regions having an area equivalent to 2 fuel rod rows, that is, an area equivalent to 7 fuel rod unit lattice cells. The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water. All of the configuration of fuel assemblies in the reactor core, the orifice state and the axial distribution of fissionable plutonium enrichment averaged over the horizontal cross section of the fuel assembly for the equilibrium reactor core are the same as FIG. 8, FIG. 9 and FIG. 10 of Embodiment 1, respectively.

The area of the region occupied by the control rod in the present embodiment is decreased from one region of 19 fuel rod unit lattice cells of Embodiment 1 to three regions of 7 fuel rod unit lattice cells. Thereby, the absorption rods can be distributively inserted into the fuel assembly, and consequently the control rod value is improved compared to Embodiment 1. The other reactor core characteristics are the same as those of Embodiment 1 and the same effect can be obtained.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Sixth Embodiment)

Figure 20:
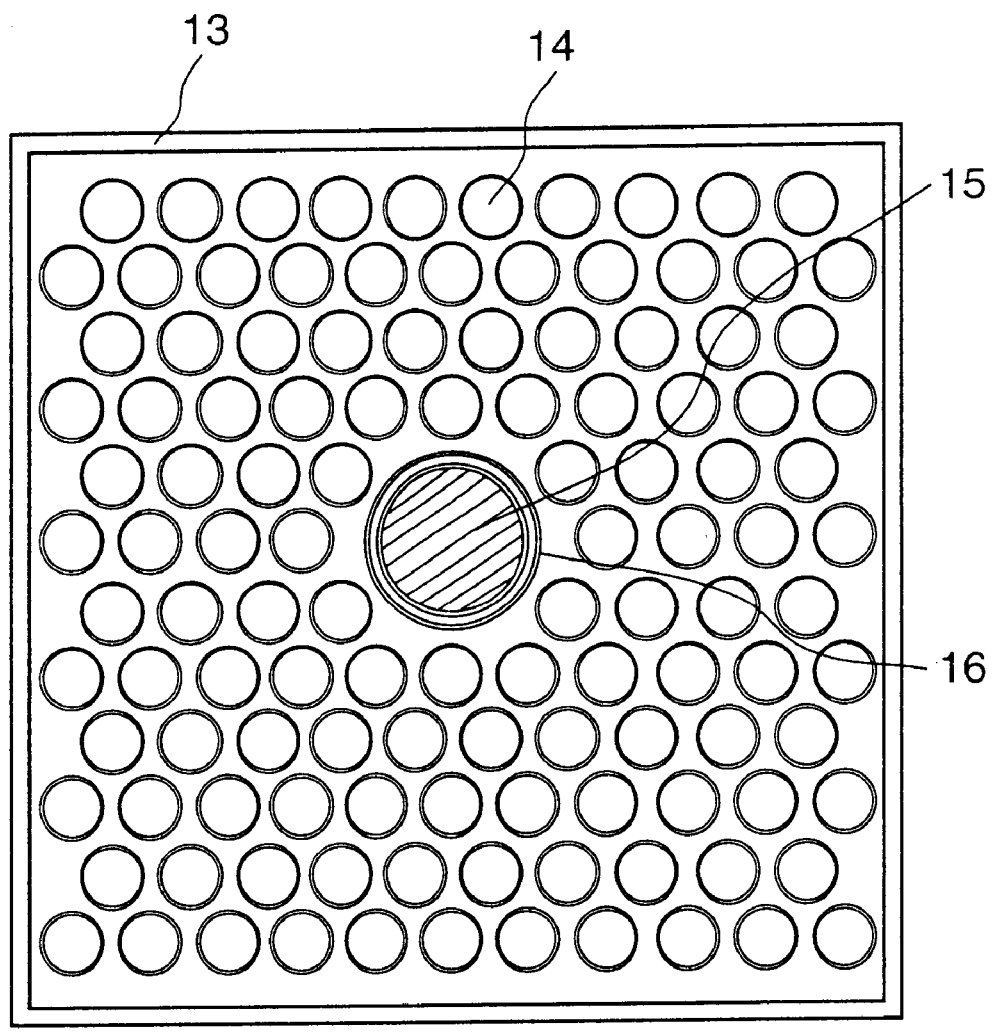
FIG. 20 is a cross-sectional plan view showing a fuel assembly to be loaded to a sixth embodiment of a reactor core in accordance with the present invention.

The present embodiment is a case where the present invention is applied to a squire fuel assembly. FIG. 20 shows the construction of the present embodiment of the fuel assembly. In a channel box 13, fuel rods 14 of 10.8 mm diameter are closely arranged in a regular triangular configuration with a 1.3 mm minimum gap between the rods. In the central portion of the fuel assembly, a guide tube 16 to insert the large-diameter control rod 15 thereinto is disposed in the region having an area equivalent to 2 fuel rod rows, that is, an area equivalent to 7 fuel rod unit lattice cells.

The large-diameter control rod is formed of an absorption rod of a stainless steel tube filled with $B_4C$, and the large-diameter control rod has a follower portion in the top end portion, the follower portion being made of carbon which is a substance having a slowing-down power smaller than that of light water. The large-diameter control rods to be inserted into four of the fuel assemblies are operated by one control rod driving mechanism. In the present embodiment, in order to flatten the fuel rod power peaking in the fuel assembly, the fissile PU enrichment of fuel rods facing the channel box and fuel rods facing the guide tube is made lower than that of the other fuel rods.

In the present embodiment, by the combination of the regular triangular lattice closed-compact square fuel assembly having the minimum gap between rods of 1.3 mm, the large-diameter control rod and the core-average void fraction of 60%, an effective water-to-fuel volume ratio of 0.34 was attained, and a breeding ratio of 1.01 was realized.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Seventh Embodiment)

Figure 21:
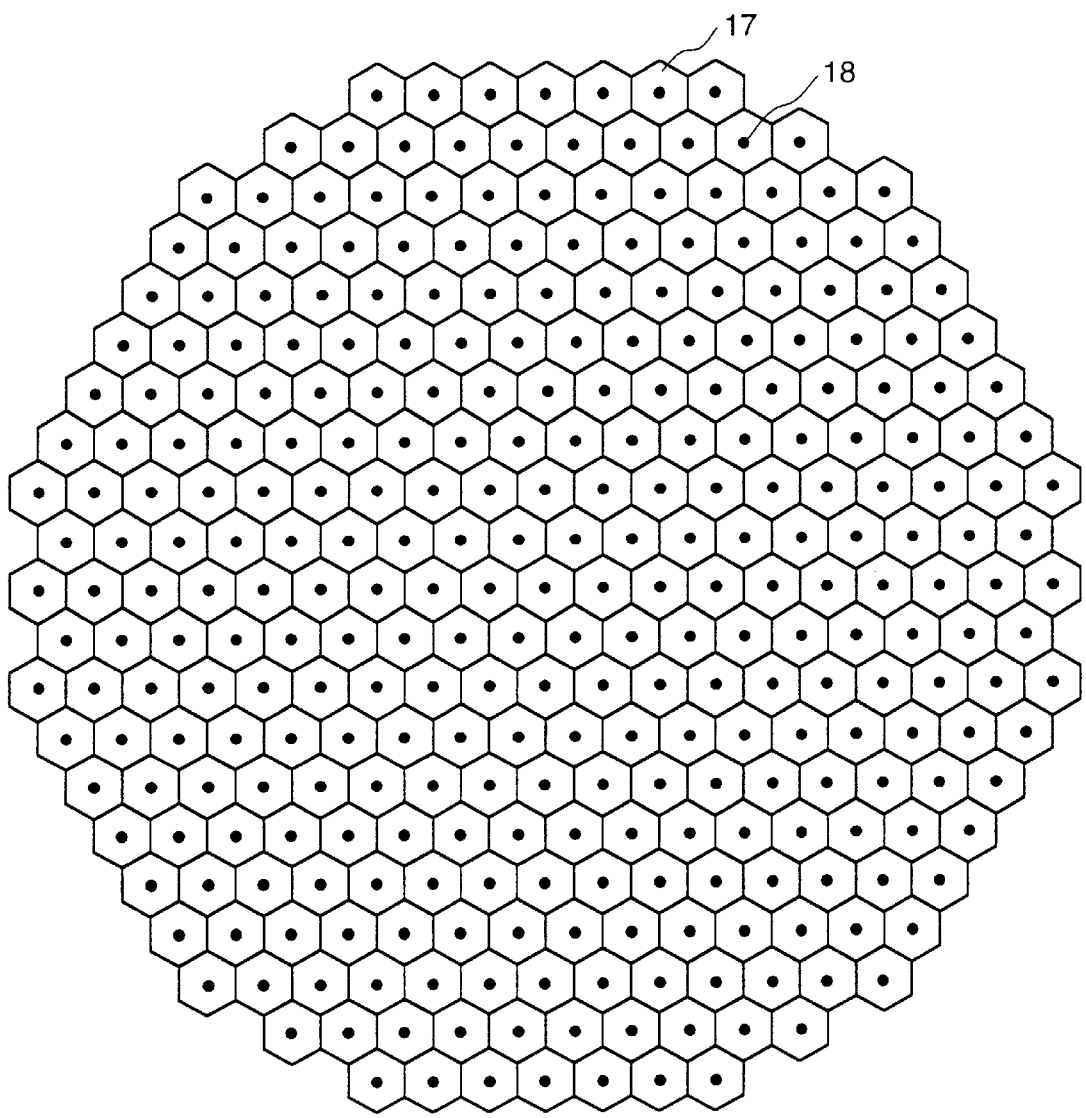
FIG. 21 is a cross-sectional plan view showing a seventh embodiment of a reactor core in accordance with the present invention.
Figure 22:
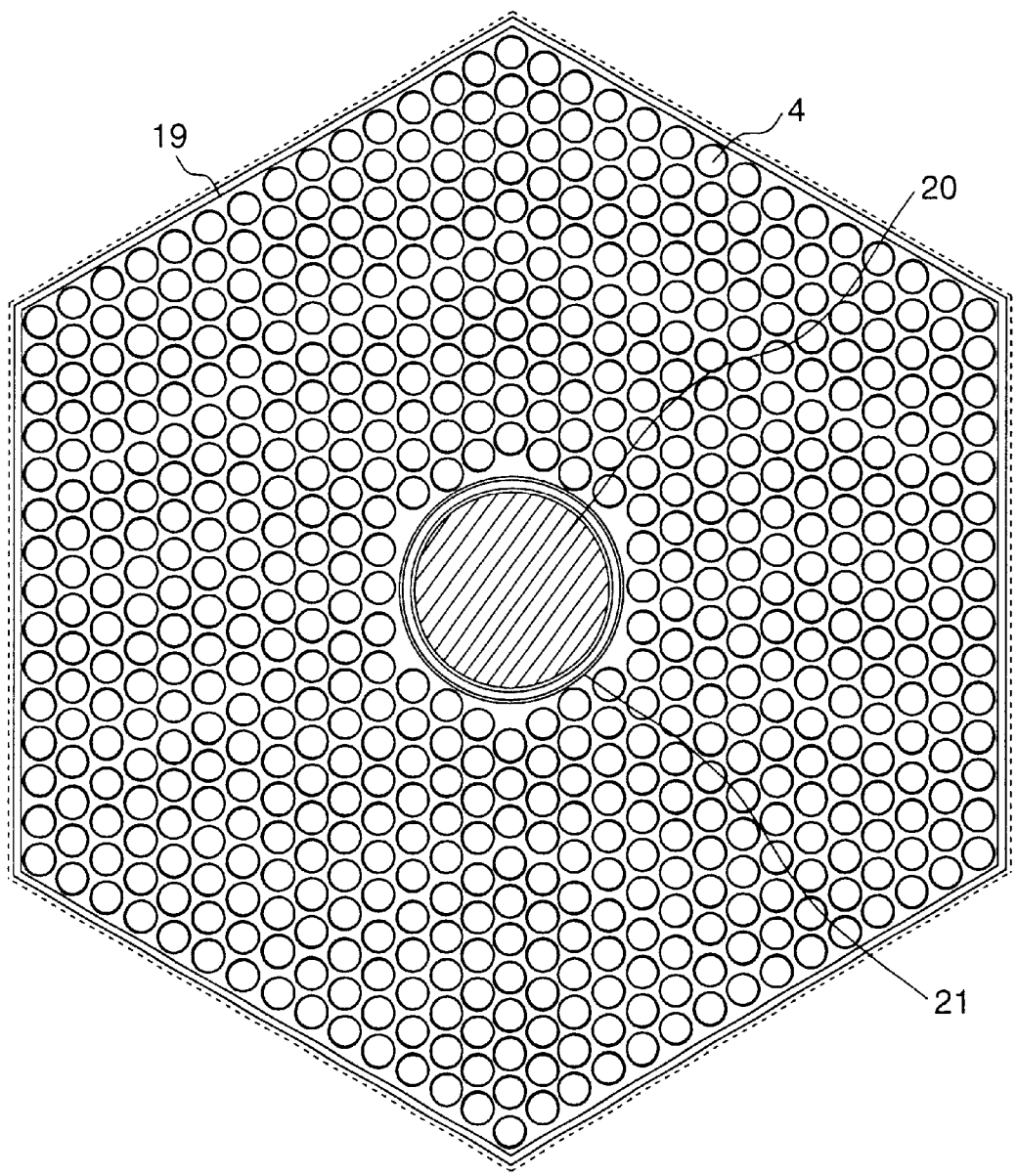
FIG. 22 is a cross-sectional plan view showing a fuel assembly to be loaded to the reactor core of FIG. 21.

A seventh embodiment of the present invention will be described below, referring to FIG. 21 to FIG. 25. The present embodiment is a reactor core in which the electric output power is the same as that of Embodiment 1, and the number of fuel assemblies, the structure of the fuel assembly and the control rod drive mechanism are changed from Embodiment 1. FIG. 21 is a cross-sectional plan view showing the present embodiment of a reactor core having an electric output power of 1356 MWe. FIG. 21 shows 313 fuel assemblies 18; and 313 control rod drive mechanisms 18 each of which operates a large-diameter control rod to be inserted into one fuel assembly. FIG. 22 shows the cross section of the fuel assembly lattice. In a channel box 19, fuel rods 4 of 10.1 mm diameter are arranged in a regular triangular configuration with a 1.3 mm gap between the rods to form an equilateral hexagonal assembly having 15 fuel rod rows. In the central portion of the fuel assembly, a guide tube 21 to insert the large-diameter control rod 20 thereinto is disposed in the region having an area equivalent to 4 fuel rod rows, that is, an area equivalent to 37 fuel rod unit lattice cells. The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water.

Figure 23:
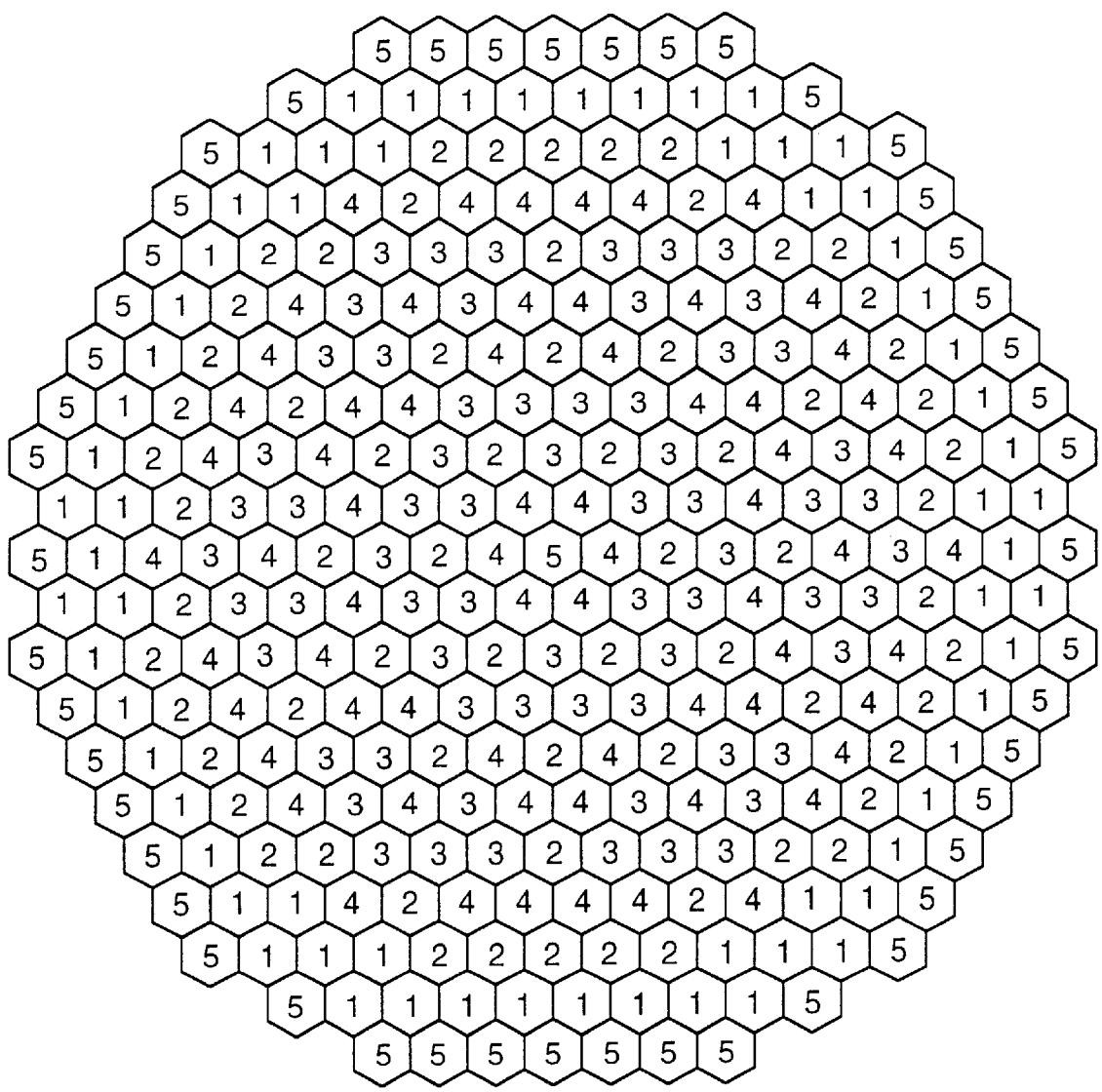
FIG. 23 is a view showing an arrangement of fuel assemblies in the embodiment of the reactor core shown FIG. 21 under the equilibrium core state.

FIG. 23 shows an arrangement of fuel assemblies under the equilibrium core state. Each of the numerals written in each of the fuel assemblies 17 indicates a period staying in the reactor core by cycle numbers. The 5 cycle fuels staying in the reactor core for the longest period are loaded in the outermost periphery of the reactor core where the neutron importance is low. The fuels of 1 cycle staying period in the reactor core having the highest neutron infinite multiplication factor are loaded in the outer region of the reactor core in the inner side of the outermost periphery to flatten the power distribution in the radial direction of the reactor core. The fuels of 2 to 4 cycle staying periods in the reactor core are distributively loaded in the inner region of the reactor core, and one 5 cycle fuel staying in the reactor core is loaded at the center of the reactor core. By doing so, the power distribution in the inner region is flattened.

Figure 24:
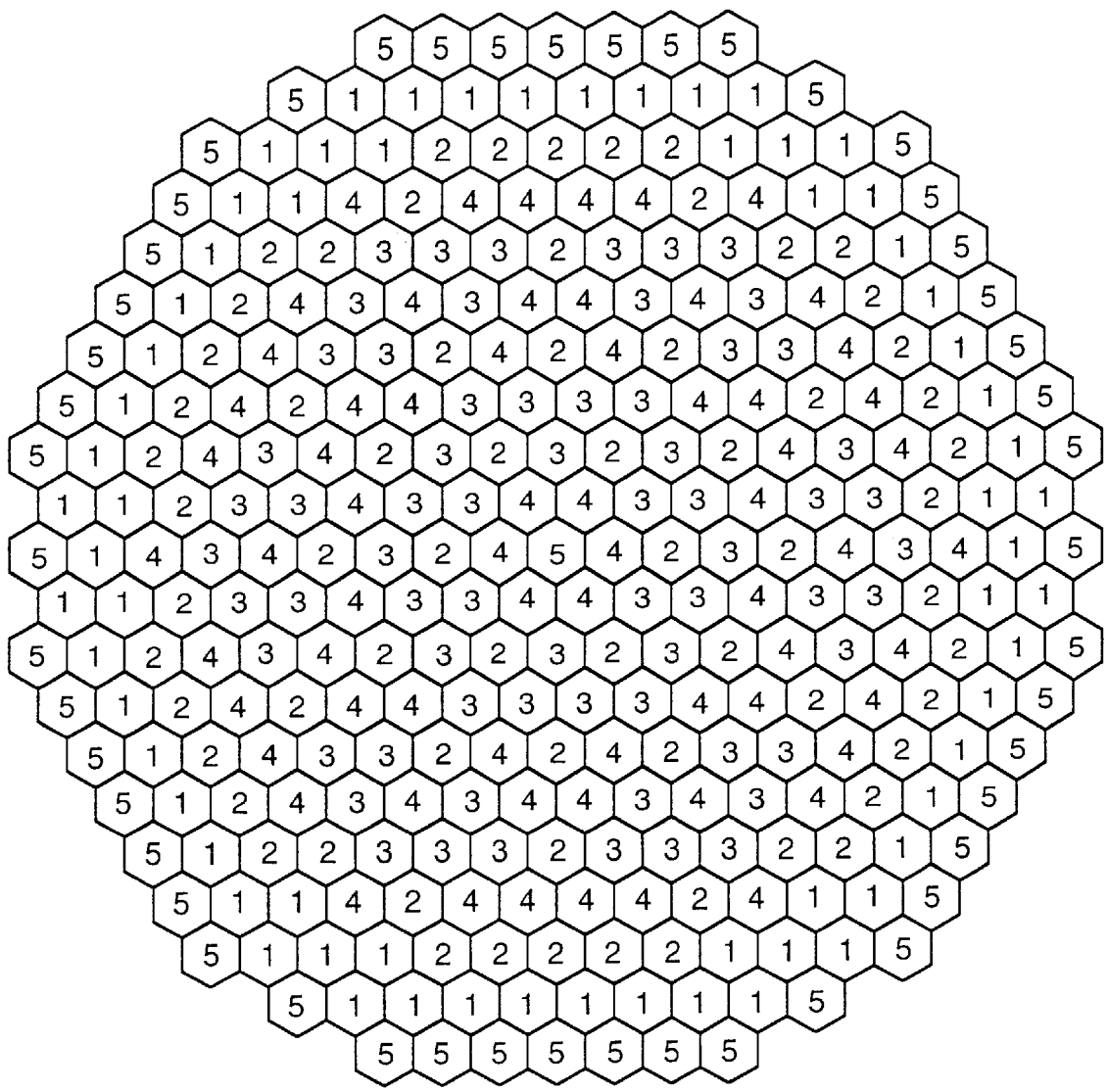
FIG. 24 is a view showing an orifice distribution in the embodiment of FIG. 21.
Figure 25:
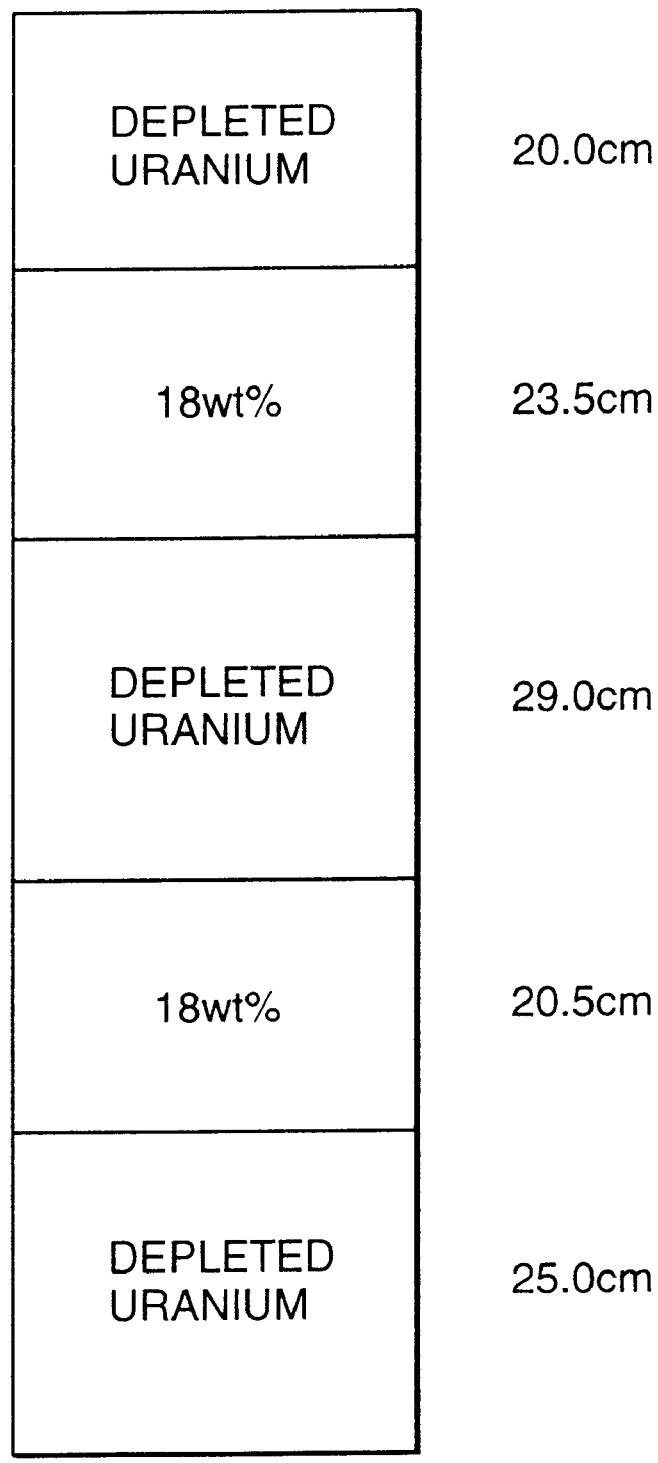
FIG. 25 is a view showing the distribution of enrichment in the axial direction of a fuel assembly to be loaded to the reactor core of FIG. 21.

FIG. 24 shows an orifice distribution in the equilibrium reactor core state. The numeral written in the fuels indicates difference in opening degree of an orifice placed in the fuel supporting portion. There are 6 regions for orifice opening degree in total, that is, 5 regions for individual cycles staying in the reactor core shown in FIG. 23 and 1 region for the center of the reactor core. The orifice diameter in the reactor outermost peripheral region (number 5) where the fuel assembly output power is small is smaller than the orifice diameters in the inner region. FIG. 25 shows the axial distribution of the fissile PU enrichment averaged with the horizontal cross section of the fuel assembly. The uranium to be added with Pu is depleted uranium.

In the present embodiment, number of fuel assemblies to be loaded in the reactor core is reduced from 504 assemblies of Embodiment 1 to 313 assemblies by increasing number of fuel rods per one fuel assembly to make the fuel assembly large in size, and thereby the reactor core is made small in size. By making the fuel assembly large in size and at the same time by increasing the region occupied by the control rod from the area equivalent to 19 fuel rod unit lattice cells of Embodiment 1 to the area equivalent to 37 fuel rod unit lattice cells, the control rod value is made nearly equivalent to that of Embodiment 1. Further, One unit of the control rod drive mechanism is used for each of the control rods to be inserted into the fuel assembly. In the present embodiment, by the combination of the regular triangular lattice closed-compact hexagonal fuel assembly, the large-diameter control rod and the core-average void fraction of 60%, an effective water-to-fuel volume ratio of 0.27 is also attained. As the result, the reactor core characteristics are the same as those of Embodiment 1 and the same effect can be obtained.

In the present embodiment, the reactor core is constructed so that the large-diameter control rod is also inserted into the fuel assembly loaded in the outermost periphery of the reactor core. However, a reactor core may be designed so that the control rod is not inserted into the fuel assembly in the outermost periphery which has a small effect on securing reactor shut-down margin.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Eighth Embodiment)

Figure 26:
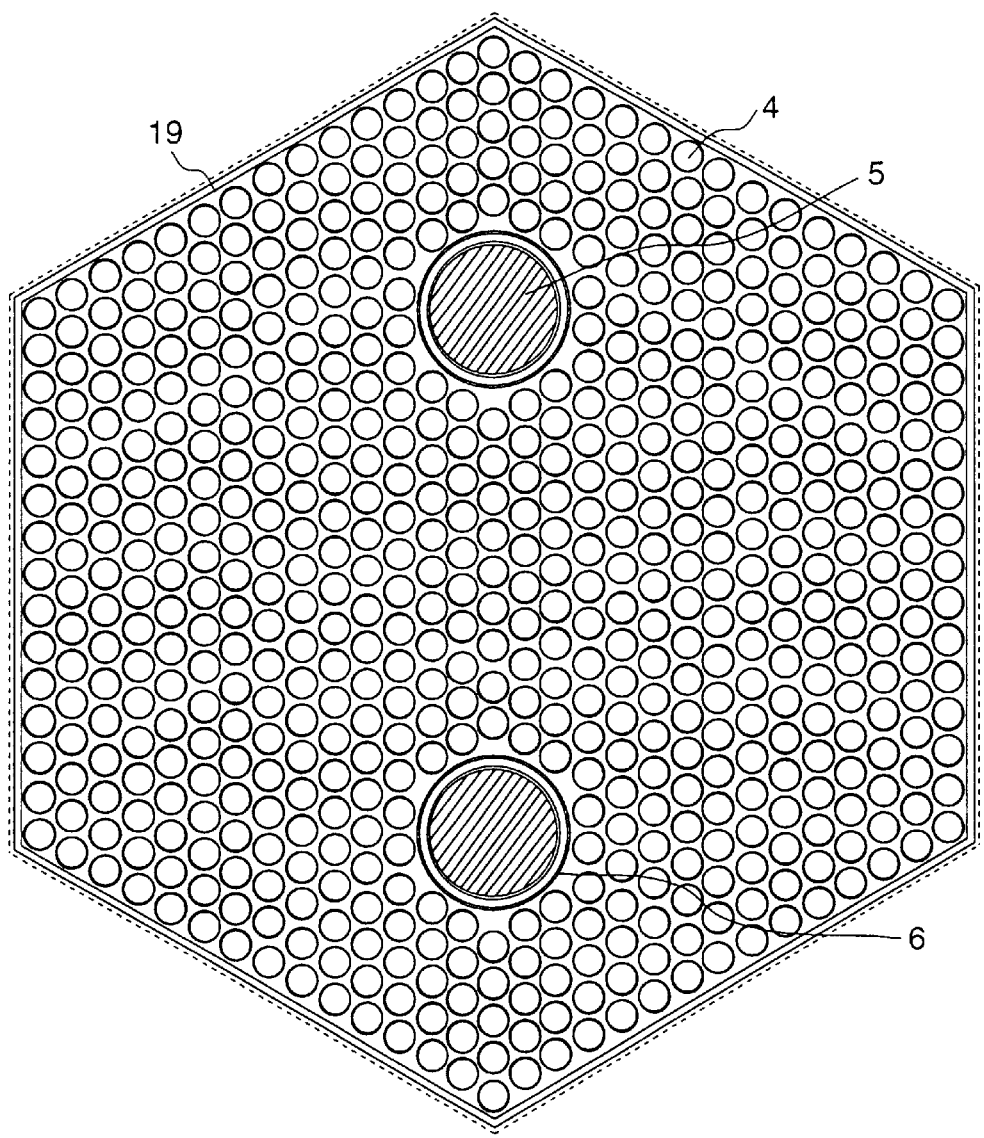
FIG. 26 is a cross-sectional plan view showing a fuel assembly to be loaded to an eighth embodiment of a reactor core in accordance with the present invention.

An eighth embodiment of the present invention will be described below, referring to FIG. 26. The present embodiment is a reactor core in which the electric output power is the same as that of Embodiment 1, and number of fuel assemblies, the structure of the fuel assembly and the control rod drive mechanism are changed from Embodiment 1. The present embodiment has an electric output power of 1356 MWe, and the reactor core is the same as FIG. 21 of Embodiment 7. FIG. 26 shows the cross section of the fuel assembly lattice. In a channel box 19, fuel rods 4 of 10.1 mm diameter are arranged in a regular triangular configuration with a 1.3 mm gap between the rods to form an equilateral hexagonal assembly having 15 fuel rod rows. At two positions in the fuel assembly, two guide tubes 6 to insert the large-diameter control rods 5 thereinto are disposed in the regions having an area equivalent to 3 fuel rod rows, that is, an area equivalent to 19 fuel rod unit lattice cells.

The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water. All of the configuration of fuel assemblies in the reactor core, the orifice state and the axial distribution of fissionable plutonium enrichment averaged over the horizontal cross section of the fuel assembly for the equilibrium reactor core are the same as FIG. 23, FIG. 24 and FIG. 25 of Embodiment 7, respectively.

The area of the region occupied by the control rod in the present embodiment is decreased from one region of 37 fuel rod unit lattice cells of Embodiment 7 to two regions of 19 fuel rod unit lattice cells. Thereby, the absorption rods can be distributively inserted into the fuel assembly, and consequently the control rod value is improved compared to Embodiment 7. The other reactor core characteristics are the same as those of Embodiment 7 and the same effect can be obtained.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Ninth Embodiment)

Figure 27:
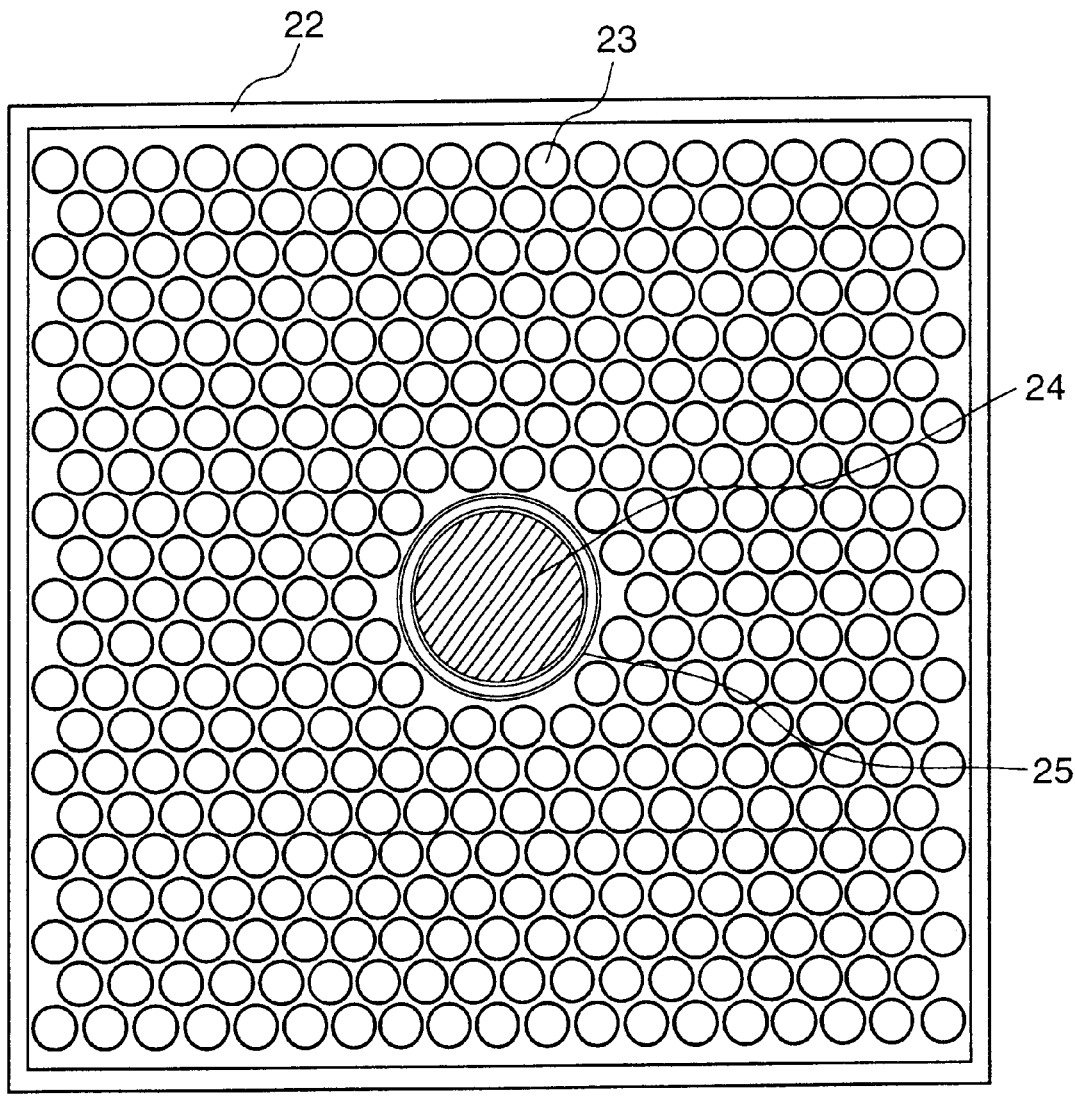
FIG. 27 is a cross-sectional plan view showing a fuel assembly to be loaded to a ninth embodiment of a reactor core in accordance with the present invention.

The present embodiment is a case where the present invention is applied to a squire fuel assembly. FIG. 27 shows the construction of the present embodiment of the fuel assembly. In a channel box 22, fuel rods 23 of 9.8 mm diameter are closely arranged in a regular triangular configuration with a 1.3 mm minimum gap between the rods. In the central portion of the fuel assembly, a guide tube 25 to insert the large-diameter control rod 24 thereinto is disposed in the region having an area equivalent to 4 fuel rod rows, that is, an area equivalent to 37 fuel rod unit lattice cells.

The large-diameter control rod is formed of an absorption rod of a stainless steel tube filled with $B_4C$, and the large-diameter control rod has a follower portion in the top end portion, the follower portion being made of carbon which is a substance having a slowing-down power smaller than that of light water. The large-diameter control rods to be inserted into four of the fuel assemblies are operated by one control rod driving mechanism. In the present embodiment, in order to flatten the fuel rod power peaking in the fuel assembly, the fissile PU enrichment of fuel rods facing the channel box and fuel rods facing the guide tube is made lower than that of the other fuel rods.

In the present embodiment, by the combination of the regular triangular lattice closed-compact square fuel assembly having the minimum gap between rods of 1.3 mm, the large-diameter control rod and the core-average void fraction of 60%, an effective water-to-fuel volume ratio of 0.34 was attained, and a breeding ratio of 1.01 was realized.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

(Tenth Embodiment)

Figure 28:
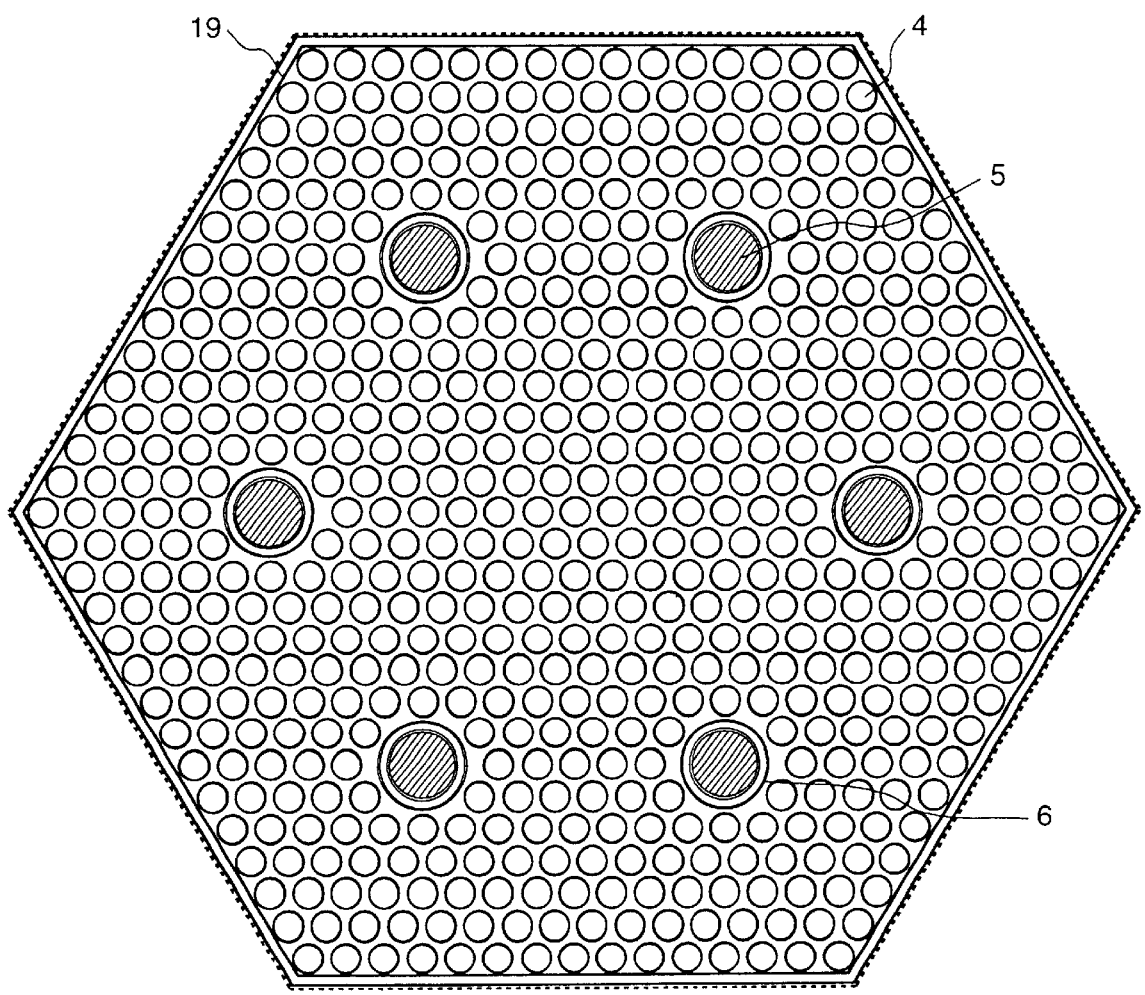
FIG. 28 is a horizontal sectional view of a fuel assembly loaded in a reactor core of a tenth embodiment of the present invention.

A tenth embodiment of the present invention is explained, referring to FIG. 28. The present embodiment is a modification of the eighth embodiment, and it is a core in which the number of fuel assemblies, the construction of each fuel assembly and each control rod drive mechanism are changed, for the same electric output as in the first embodiment. In the present embodiment, the electric output is 1356 MWe, a core cross-sectional view thereof is the same as FIG. 21 of the seventh embodiment. FIG. 28 shows a cross-section of a fuel assembly lattice. Inside a channel box 19, fuel rods 4 of diameter 10.1 mm are arranged in a regular triangular configulation with a gap of 1.3 mm between the fuel rods to form an equilateral hexagonal fuel assembly having 15 fuel rod rows. Inside the fuel assembly, guide tubes 6, in each of which a large-diameter control rod 5 is inserted, are arranged at six locations, and each guide tube 6 is disposed in a region having an area equivelent to two fuel rod rows, that is, an area equivalent to 7 fuel rod unit lattice cells.

The large-diameter control rod is formed of an absorption rod of a stainless steel tube filled with $B_4C$. Further, the large-diameter control rod has a follower portion in the top end portion, the follower portion being made of carbon which is a substance having a slowing-down power smaller than that of light water. All of the configuration of fuel assemblies in the reactor core, the orifice state and the axial distribution of fissionable plutonium enrichment averaged over the horizontal cross section of the fuel assembly for the equilibrium reactor core are the same as FIG. 23, FIG. 24 and FIG. 25 of Embodiment 7, respectively.

The area of the region occupied by the control rod in the present embodiment is decreased from one region of 37 fuel rod unit lattice cells of Embodiment 7 to six regions of 7 fuel rod unit lattice cells. Thereby, the absorption rods can be distributively inserted into the fuel assembly, and consequently the control rod value is improved compared to Embodiment 7. The other reactor core characteristics are the same as those of Embodiment 7 and the same effect can be obtained.

In the present embodiment, the same or more effects can be also obtained by the fuel enriched by adding plutonium to natural uranium or the degraded uranium recovered from used fuel or the low enriched uranium instead of the depleted uranium. Further, the other actinides can be added together with Pu.

According to the present invention, by attaining the breeding ratio of near 1.0 or more than 1.0 using the fuel which is enriched by adding plutonium or plutonium to depleted uranium, natural uranium, degraded uranium or low enriched uranium, the depleted uranium, the natural uranium, the degraded uranium or the low enriched uranium can be burned using the plutonium like a catalyst, which can contribute to the long-term stable energy supply.

What is claimed is:

1. A light water reactor core comprising fuel which is enriched by adding plutonium or plutonium and an actinide to a uranium containing at least one of a depleted uranium, natural uranium, a degraded uranium and a low enriched uranium, which further comprises:

fuel assemblies having fuel rods arranged in a triangular lattice configuration; and large-diameter control rods to be inserted into said fuel assemblies, said large-diameter control rod comprising at least one absorption rod and guide tubes in which said large diameter control rods are inserted, each said guide tube being disposed in a region having an area equivalent to at least 7 fuel rod unit lattice cells, wherein a breeding ratio of the reactor core is near 1.0 or larger than 1.0, and a void coefficient of the reactor core is negative.

2. A light water reactor core comprising fuel which is enriched by adding plutonium or plutonium and an actinide to a uranium containing at least one of a depleted uranium, natural uranium, a degraded uranium and a low enriched uranium, which further comprises;

fuel assemblies having fuel rods arranged in a triangular lattice configuration; and large-diameter control rods to be inserted into said fuel assemblies, said large-diameter control rod comprising at least one absorption rod and guide tubes in which said large diameter control rods are inserted, each said guide tube being disposed in a region having an area equivalent to at least 7 fuel rod unit lattice cells, wherein a breeding ratio of the reactor core is near 1.0 or larger than 1.0, and a power coefficient of the reactor core is negative, and a void coefficient of the reactor core is positive or zero.

3. A light water reactor core according to claim 1, wherein said breeding ratio is within the range of 1.0 to 1.15.

4. A fuel assembly comprising fuel which is enriched by adding plutonium or plutonium and an actinide to a uranium containing at least one of a depleted uranium, natural uranium, a degraded uranium and a low enriched uranium, which further comprises:

fuel assemblies having fuel rods arranged in a triangular lattice configuration; and at least one guide tube to insert a large-diameter control rod thereinto, said guide tube disposed in a region having an area equivalent to at least 7 fuel rod unit lattice cells, wherein a breeding ratio of the fuel assembly is near 1.0 or larger than 1.0.

5. A fuel assembly according to claim 4, which comprises a water-excluding region on a surface of said guide tube, said water-excluding region being formed of a substance having a slowing down power smaller than a slowing down power of light water.

6. A fuel assembly according to claim 4, which comprises fuel rods closely arranged in a triangular lattice configuration, and a gap between said rods is within the range of 0.7 to 2.0 mm.

7. A light water reactor core, which is composed of the fuel assemblies according to claim 6.

8. A fuel assembly according to claim 4, which comprises fuel rods closely arranged in a triangular lattice configuration, and an effective water-to-fuel volume ratio of the fuel assembly is within the range of 0.1 to 0.6.

9. A light water reactor core, which comprises the fuel assemblies according to claim 8.

10. A light water reactor core according to claim 1, wherein an average fissionable plutonium enrichment in the reactor core except for an outer peripheral portion and blanket portions of a top and a bottom end portions is within the range of 6 to 20 wt %.

11. A fuel assembly according to claim 4, wherein an average fissionable plutonium enrichment in a fuel region except for blanket portions of a top and a bottom end portions is within the range of 6 to 20 wt %.

12. A light water reactor core according to claim 1, wherein a core-average void fraction under operation of an output power higher than 50% of a rated output power is within the range of 45 to 70%.

13. A light water reactor core according to claim 1, wherein all the large-diameter control rods connected to one control drive mechanism are inserted into one fuel assembly, and said large-diameter control rods are inserted into all of the fuel assemblies loaded in a region except for an outermost peripheral of the reactor core.

14. A light water reactor core according to claim 13, wherein a shape of a transverse plane of said fuel assembly is hexagonal or square.

15. A light water reactor core according to claim 1, wherein the plurality of large-diameter control rods connected to one control drive mechanism are inserted into three hexagonal fuel assemblies, and said large-diameter control rods are inserted into all of the fuel assemblies loaded in a region except for an outermost peripheral of the reactor core.

16. A light water reactor core according to claim 1, wherein the plurality of lare-diameter control rods connected to one control drive mechanism are inserted into four square fuel assemblies, and said large-diameter control rods are inserted into all of the fuel assemblies loaded in a region except for an outermost peripheral of the reactor core.

17. A light water reactor core according to claim 1, wherein said large-diameter control rod comprises a follower portion in a top end portion, said follower portion being made of a substance having a slowing down power smaller than a slowing down power of light water.

18. A fuel assembly according to claim 4, wherein an average value of fissionable plutonium enrichments of a fuel rod arranged in a region adjacent to said guide tube and a fuel rod arranged in a region most distant from a center of said fuel assembly is smaller than an average value of fissionable plutonium enrichments of fuel rods arranged in the other positions.

19. A light water reactor core according to claim 1, wherein an average output power density of in a reactor core region except for an outer peripheral portion and blanket portions of a top and a bottom end portions is within the range of 100 to 300 kW/l.

20. A light water reactor core according to claim 1, wherein in regard to a height direction of the core except for blanket portions of a top and a bottom end portions, a length having an average fissionable plutonium enrichment with respect to a horizontal cross section of the fuel assembly higher than 6 wt % is within the range of 40 cm to 140 cm.

21. A fuel assembly according to claim 4, wherein in regard to a height direction of the reactor core except for blanket portions of a top and a bottom end portions, a length having an average fissionable plutonium enrichment with respect to a horizontal cross section of the fuel assembly higher than 6 wt % is within the range of 40 cm to 140 cm.

22. A fuel assembly according to claim 4, wherein an average value of fissionable plutonium enrichment in an upper half of the fuel assembly except for blanket portions of a top and a bottom end portions is lower than an average value of fissionable plutonium enrichment in an lower half.

23. A fuel assembly according to claim 4, wherein in regard to a height direction of the fuel assembly except for blanket portions of a top and a bottom end portions, the fuel assembly comprises regions having an average fissionable plutonium enrichment higher than 6 wt % in an upper and a lower parts of the fuel assembly; and a region having an average fissionable plutonium enrichment lower than 6 wt % in a region near a middle portion between the upper and the lower regions.

24. A fuel assembly according to claim 23, wherein in regard to a height direction of the fuel assembly except for blanket portions of the top and the bottom end portions, the average fissionable plutonium enrichments in the upper and the lower regions sandwiching the portion having the average fissionable plutonium enrichment lower than 6 wt % in the region near the middle portion between the upper and the lower regions are different from each other.

25. A light water reactor core according to claim 1, wherein a steam weight ratio at an exit of the reactor core under operation of an output power higher than 50% of a rated output power is within the range of 20 wt % to 40 wt %.

26. A light water reactor core according to claim 1, wherein the reactor core except for an outermost periphery of the reactor core is radially divided into two equal-area regions, and fuel assemblies are loaded so that an average value of number of cycles staying in the reactor core of the fuel assemblies loaded in the outer reactor core region is smaller than an average value of number of cycles staying in the reactor core of the fuel assemblies loaded in the inner reactor core region.

27. A light water reactor core according to claim 1, wherein an average value of orifice pressure drop coefficient of fuel assemblies in an outermost periphery of the reactor core and adjacent to the outermost periphery is larger than an average value of orifice pressure drop coefficient of fuel assemblies in the other regions.

28. A fuel assembly according to claim 4, wherein plutonium and uranium extracted from used fuel as loaded into the fuel assembly to be recycled together.

29. A light water reactor core composed of the fuel assemblies according to claim 28.

30. A fuel assembly according to claim 4, wherein plutonium, uranium and actinides extracted from used fuel are loaded at a time to be recycled together.

31. A light water reactor core composed of the fuel assemblies according to claim 30.

32. A light water rector core comprising fuel which is enriched by adding plutonium or plutonium and an actinide to a uranium containing at least one of a depleted uranium, natural uranium, a degraded uranium and a low enriched uranium, which further comprises:

fuel assemblies having fuel rods arranged in a triangular lattice configuration; and large-diameter control rods to be inserted into said fuel assemblies, said large-diameter control rods each comprising at least one absorption rod having a transverse cross-sectional area larger than a cross-sectional area of a unit lattice cell of the fuel rod; and guide tubes in which said large-diameter control rods are inserted, said guide tubes each having water excluding rods outside for excluding light water between said guide tube and fuel rods adjacent to said guide tube and disposed in a region having an area equivalent to at least 7 fuel rod unit lattice cells, wherein a breeding ratio of the reactor core is near 1.0 or larger than 1.0, and a void coefficient of the reactor core is negative.

* * * * *